United States Patent
Wang et al.

(10) Patent No.: US 8,957,154 B2
(45) Date of Patent: *Feb. 17, 2015

(54) DISK-LIKE NANOPARTICLES

(71) Applicant: Bridgestone Corporation, Tokyo (JP)

(72) Inventors: Xiaorong Wang, Hudson, OH (US);
Victor J Foltz, Akron, OH (US);
Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,266

(22) Filed: Oct. 15, 2012

(65) Prior Publication Data

US 2013/0261225 A1    Oct. 3, 2013

Related U.S. Application Data

(63) Continuation of application No. 12/288,174, filed on Oct. 17, 2008, now Pat. No. 8,288,473, which is a continuation-in-part of application No. 12/184,895, filed on Aug. 1, 2008, now abandoned, which is a continuation-in-part of application No. 11/641,514, filed on Dec. 19, 2006, now Pat. No. 7,884,160.

(60) Provisional application No. 60/751,602, filed on Dec. 19, 2005.

(51) Int. Cl.
*C08L 53/02* (2006.01)
*C08K 5/01* (2006.01)
*B82Y 30/00* (2011.01)
*C08L 9/06* (2006.01)

(52) U.S. Cl.
CPC . *C08K 5/01* (2013.01); *B82Y 30/00* (2013.01); *C08L 9/06* (2013.01)
USPC ............................. 525/89; 525/98; 525/271

(58) Field of Classification Search
USPC .............................. 525/89, 98, 271
See application file for complete search history.

(56) References Cited

U.S. PATENT DOCUMENTS

| | | |
|---|---|---|
| 2,531,396 A | 11/1950 | Carter et al. |
| 3,177,186 A | 4/1965 | Miller |
| 3,598,884 A | 8/1971 | Wei et al. |
| 3,793,402 A | 2/1974 | Owens |
| 3,840,620 A | 10/1974 | Gallagher |
| 3,972,963 A | 8/1976 | Schwab et al. |
| 4,075,186 A | 2/1978 | Ambrose et al. |
| 4,233,409 A | 11/1980 | Bulkley |
| 4,247,434 A | 1/1981 | Vanderhoff et al. |
| 4,248,986 A | 2/1981 | Lai et al. |
| 4,326,008 A | 4/1982 | Rembaum |
| 4,386,125 A | 5/1983 | Shiraki et al. |
| 4,408,018 A | 10/1983 | Bartman et al. |
| 4,417,029 A | 11/1983 | Milkovich |
| 4,471,093 A | 9/1984 | Furukawa et al. |
| 4,543,403 A | 9/1985 | Isayama et al. |
| 4,600,749 A | 7/1986 | Minekawa et al. |
| 4,617,346 A | 10/1986 | Sonoda |
| 4,659,782 A | 4/1987 | Spinelli |
| 4,659,790 A | 4/1987 | Shimozato et al. |
| 4,717,655 A | 1/1988 | Fluwyler |
| 4,722,770 A | 2/1988 | Blottiere et al. |
| 4,725,522 A | 2/1988 | Breton et al. |
| 4,764,572 A | 8/1988 | Bean, Jr. |
| 4,774,189 A | 9/1988 | Schwartz |
| 4,798,691 A | 1/1989 | Kasai et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,920,160 A | 4/1990 | Chip et al. |
| 4,942,209 A | 7/1990 | Gunesin |
| 4,987,202 A | 1/1991 | Zeigler |
| 5,036,138 A | 7/1991 | Stamhuis et al. |
| 5,066,729 A | 11/1991 | Srayer, Jr. et al. |
| 5,073,498 A | 12/1991 | Schwartz et al. |
| 5,075,377 A | 12/1991 | Kawabuchi et al. |

(Continued)

FOREIGN PATENT DOCUMENTS

| | | |
|---|---|---|
| CA | 2127919 | 3/1995 |
| CN | 1560094 | 1/2005 |

(Continued)

OTHER PUBLICATIONS

Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).

Alexandridis, Paschalis et al., "Amphiphilic Block Copolymers: Self-Assembly and Applications", Elsevier Science B.V., pp. 1-435 (2000).

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

(Continued)

*Primary Examiner* — Jeffrey Mullis
(74) *Attorney, Agent, or Firm* — Meredith Hooker; Nathan Lewis

(57) ABSTRACT

A disk-like nanoparticle includes a core layer that comprises a cross-linked multi-vinyl substituted aromatic hydrocarbon and a shell layer that comprises tri-block copolymer chains, each having a first, a second, and a third block. The first and third blocks of the tri-block copolymer chains comprise vinyl aromatic monomer units and are crosslinked with the core. The second block comprises conjugated diene monomer units and comprises a top and bottom axial surface of the disk-like nanoparticle. In the case of a nanoparticle having A-B-C tri-block copolymer chains, the third block comprises a top and bottom axial surface of the disk-like nanoparticle.

20 Claims, 16 Drawing Sheets

(56) References Cited

U.S. PATENT DOCUMENTS

| | | |
|---|---|---|
| 5,130,377 A | 7/1992 | Trepka et al. |
| 5,169,914 A | 12/1992 | Kaszas et al. |
| 5,183,851 A | 2/1993 | Visani et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,256,736 A | 10/1993 | Trepka et al. |
| 5,290,875 A | 3/1994 | Moczygemba et al. |
| 5,290,878 A | 3/1994 | Yamamoto et al. |
| 5,296,547 A | 3/1994 | Nestegard et al. |
| 5,298,559 A | 3/1994 | Fujii et al. |
| 5,329,005 A | 7/1994 | Lawson et al. |
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,674,592 A | 10/1997 | Clark et al. |
| 5,686,528 A | 11/1997 | Wills et al. |
| 5,688,856 A | 11/1997 | Austgen, Jr. et al. |
| 5,728,791 A | 3/1998 | Tamai et al. |
| 5,733,975 A | 3/1998 | Aoyama et al. |
| 5,742,118 A | 4/1998 | Endo et al. |
| 5,747,152 A | 5/1998 | Oka et al. |
| 5,763,551 A | 6/1998 | Wunsch et al. |
| 5,773,521 A | 6/1998 | Hoxmeier et al. |
| 5,834,563 A | 11/1998 | Kimura et al. |
| 5,847,054 A | 12/1998 | McKee et al. |
| 5,849,847 A | 12/1998 | Quirk |
| 5,891,947 A | 4/1999 | Hall et al. |
| 5,905,116 A | 5/1999 | Wang et al. |
| 5,910,530 A | 6/1999 | Wang et al. |
| 5,955,537 A | 9/1999 | Steininger Clites et al. |
| 5,986,010 A | 11/1999 | Clites et al. |
| 5,994,468 A | 11/1999 | Wang et al. |
| 6,011,116 A | 1/2000 | Aoyama et al. |
| 6,075,092 A | 6/2000 | Nakamura et al. |
| 6,087,016 A | 7/2000 | Feeney et al. |
| 6,117,932 A | 9/2000 | Hasegawa et al. |
| 6,127,488 A | 10/2000 | Obrecht et al. |
| 6,166,855 A | 12/2000 | Ikeyama et al. |
| 6,180,693 B1 | 1/2001 | Tang et al. |
| 6,191,217 B1 | 2/2001 | Wang et al. |
| 6,204,320 B1 | 3/2001 | Blok et al. |
| 6,204,354 B1 | 3/2001 | Wang et al. |
| 6,207,263 B1 | 3/2001 | Takematsu et al. |
| 6,252,014 B1 | 6/2001 | Knauss |
| 6,268,451 B1 | 7/2001 | Faust et al. |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,437,050 B1 | 8/2002 | Krom et al. |
| 6,441,090 B1 | 8/2002 | Demirors et al. |
| 6,448,353 B1 | 9/2002 | Nelson et al. |
| 6,489,378 B1 | 12/2002 | Sosa et al. |
| 6,524,595 B1 | 2/2003 | Perrier et al. |
| 6,573,313 B2 | 6/2003 | Li et al. |
| 6,573,330 B1 | 6/2003 | Fujikake et al. |
| 6,649,702 B1 | 11/2003 | Rapoport et al. |
| 6,663,960 B1 | 12/2003 | Murakami et al. |
| 6,689,469 B2 | 2/2004 | Wang et al. |
| 6,693,746 B1 | 2/2004 | Nakamura et al. |
| 6,706,823 B2 | 3/2004 | Wang et al. |
| 6,727,307 B2 | 4/2004 | Kondo et al. |
| 6,737,486 B2 | 5/2004 | Wang |
| 6,774,185 B2 | 8/2004 | Lin et al. |
| 6,777,500 B2 | 8/2004 | Lean et al. |
| 6,780,937 B2 | 8/2004 | Castner |
| 6,872,785 B2 | 3/2005 | Wang et al. |
| 6,875,818 B2 | 4/2005 | Wang |
| 6,956,084 B2 | 10/2005 | Wang et al. |
| 7,056,840 B2 | 6/2006 | Miller et al. |
| 7,071,246 B2 | 7/2006 | Xie et al. |
| 7,112,369 B2 | 9/2006 | Wang et al. |
| 7,179,864 B2 | 2/2007 | Wang |
| 7,193,004 B2 | 3/2007 | Weydert et al. |
| 7,205,370 B2 | 4/2007 | Wang et al. |
| 7,217,775 B2 | 5/2007 | Castner |
| 7,238,751 B2 | 7/2007 | Wang et al. |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng et al. |
| 7,695,813 B2 | 4/2010 | Schultes et al. |
| 7,718,738 B2 | 5/2010 | Bohm et al. |
| 7,820,771 B2 | 10/2010 | Lapra et al. |
| 7,884,160 B2 | 2/2011 | Wang et al. |
| 7,897,690 B2 | 3/2011 | Wang et al. |
| 8,063,142 B2 | 11/2011 | Wang et al. |
| 8,288,473 B2 * | 10/2012 | Wang et al. ............... 525/89 |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2003/0124353 A1 | 7/2003 | Wang et al. |
| 2003/0149185 A1 | 8/2003 | Wang et al. |
| 2003/0198810 A1 | 10/2003 | Wang et al. |
| 2003/0225190 A1 | 12/2003 | Borbely et al. |
| 2004/0033345 A1 | 2/2004 | Dubertret et al. |
| 2004/0059057 A1 | 3/2004 | Swisher et al. |
| 2004/0091546 A1 | 5/2004 | Johnson et al. |
| 2004/0127603 A1 | 7/2004 | Lean et al. |
| 2004/0143064 A1 | 7/2004 | Wang |
| 2004/0198917 A1 | 10/2004 | Castner |
| 2005/0006014 A1 | 1/2005 | Halasa et al. |
| 2005/0101743 A1 | 5/2005 | Stacy et al. |
| 2005/0122819 A1 | 6/2005 | Park et al. |
| 2005/0182158 A1 | 8/2005 | Ziser et al. |
| 2005/0192408 A1 | 9/2005 | Lin et al. |
| 2005/0197462 A1 | 9/2005 | Wang et al. |
| 2005/0203248 A1 | 9/2005 | Zheng et al. |
| 2005/0220750 A1 | 10/2005 | Robert et al. |
| 2005/0220890 A1 | 10/2005 | Charmot et al. |
| 2005/0228072 A1 | 10/2005 | Winkler et al. |
| 2005/0228074 A1 | 10/2005 | Wang et al. |
| 2005/0282956 A1 | 12/2005 | Bohm et al. |
| 2006/0084722 A1 | 4/2006 | Lin et al. |
| 2006/0116473 A1 | 6/2006 | Castner et al. |
| 2006/0147714 A1 | 7/2006 | Schultes et al. |
| 2006/0173130 A1 | 8/2006 | Wang et al. |
| 2007/0027264 A1 | 2/2007 | Wang et al. |
| 2007/0081830 A1 | 4/2007 | Bender et al. |
| 2007/0135579 A1 | 6/2007 | Obrecht et al. |
| 2007/0142550 A1 | 6/2007 | Wang et al. |
| 2007/0142559 A1 | 6/2007 | Wang et al. |
| 2007/0149649 A1 | 6/2007 | Wang et al. |
| 2007/0149652 A1 | 6/2007 | Yoon et al. |
| 2007/0161754 A1 | 7/2007 | Bohm et al. |
| 2007/0181302 A1 | 8/2007 | Bicerano |
| 2007/0185273 A1 | 8/2007 | Hall et al. |
| 2007/0196653 A1 | 8/2007 | Hall et al. |
| 2008/0145660 A1 | 6/2008 | Wang et al. |
| 2008/0149238 A1 | 6/2008 | Kleckner et al. |
| 2008/0160305 A1 | 7/2008 | Wang et al. |
| 2008/0188579 A1 | 8/2008 | Wang et al. |
| 2008/0286374 A1 | 11/2008 | Wang et al. |
| 2008/0305336 A1 | 12/2008 | Wang et al. |
| 2009/0005491 A1 | 1/2009 | Warren et al. |
| 2009/0048390 A1 | 2/2009 | Wang et al. |

(56) References Cited

U.S. PATENT DOCUMENTS

| | | |
|---|---|---|
| 2009/0270558 A1 | 10/2009 | Gandon-pain et al. |
| 2009/0306246 A1 | 12/2009 | Gervat et al. |
| 2010/0004398 A1 | 1/2010 | Wang et al. |
| 2010/0016472 A1 | 1/2010 | Wang et al. |
| 2010/0016512 A1 | 1/2010 | Wang et al. |
| 2010/0324167 A1 | 12/2010 | Warren et al. |
| 2011/0021702 A1 | 1/2011 | Gandon-Pain et al. |
| 2011/0024011 A1 | 2/2011 | Castner et al. |
| 2011/0213066 A1 | 9/2011 | Wang et al. |
| 2011/0236686 A1 | 9/2011 | Kitano et al. |
| 2012/0132346 A1 | 5/2012 | Chen et al. |

FOREIGN PATENT DOCUMENTS

| | | |
|---|---|---|
| DE | 3735403 | 5/1989 |
| DE | 4241538 A1 | 6/1994 |
| EP | 0143500 | 6/1985 |
| EP | 0265142 A2 | 4/1988 |
| EP | 0322905 | 7/1989 |
| EP | 0352042 | 1/1990 |
| EP | 0472344 | 2/1992 |
| EP | 0590491 A2 | 4/1994 |
| EP | 0742268 | 11/1996 |
| EP | 1783168 | 5/2007 |
| JP | 70002106 B | 1/1970 |
| JP | 2191619 | 7/1990 |
| JP | 2196893 | 8/1990 |
| JP | 06-093057 | 4/1994 |
| JP | 06248017 | 9/1994 |
| JP | 7011043 | 1/1995 |
| JP | 08199062 | 8/1996 |
| JP | 2000514791 | 11/2000 |
| JP | 2005-537341 | 12/2005 |
| JP | 2006072283 | 3/2006 |
| JP | 2006106596 | 4/2006 |
| JP | 2007304409 | 11/2007 |
| RU | 2184125 | 6/2002 |
| SU | 465010 | 3/1975 |
| WO | 9104992 | 4/1991 |
| WO | 9704029 | 2/1997 |
| WO | 0187999 A2 | 11/2001 |
| WO | 0202472 | 1/2002 |
| WO | 0231002 A1 | 4/2002 |
| WO | 0241987 | 5/2002 |
| WO | 0244290 | 6/2002 |
| WO | 02100936 | 12/2002 |
| WO | 03032061 | 4/2003 |
| WO | 2006069793 | 7/2006 |
| WO | 2008014464 | 1/2008 |
| WO | 2008079276 | 7/2008 |
| WO | 2008079807 | 7/2008 |
| WO | 2009006434 | 1/2009 |

OTHER PUBLICATIONS

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Bahadur, Pratap, "Block copolymers—Their microdomain formation (in solid state) and surfactant behaviour (in solution)", Current Science, vol. 80, No. 8, pp. 1002-1007 (Apr. 25, 2001).

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Berger, Sebastian et al., "Stimuli-Responsive Bicomponent Polymer Janus Particles by 'Grafting from'/ 'Grafting to' Approaches," Macromolecules, 41, pp. 9669-9676 (2008).

Bohm, Georg et al., "Emerging materials: technology for new tires and other rubber products", Tire Technology International, 2006 (4 pp.).

Borukhov, Itamar et al., "Enthalpic Stabilization of Brush-Coated Particles in a Polymer Melt", Macromolecules, vol. 35, pp. 5171-5182 (2002).

Bradley, John S., "The Chemistry of Transition Metal Colloids", Clusters and Colloids: From Theory to Applications, Chapter 6, Weinheim, VCH, pp. 459-544 (1994).

Braun, Hartmut et al., "Enthalpic interaction of diblock copolymers with immiscible polymer blend components", Polymer Bulletin, vol. 32, pp. 241-248 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).

Calderara, Frederic et al., "Synthesis of chromophore-labelled polystyrene/poly(ethylene oxide) diblock copolymers", Makromol. Chem., 194, pp. 1411-1420 (1993).

Canham et al., "Formation of Worm-like Micelles from a Polystyrene-Polybutadiene-Polystyrene Block Copolymer in Ethyl Acetate", J.C.S. Faraday I, 76, 1857-1867 (1980).

Chen, Ming-Qing et al., "Graft Copolymers Having Hydrophobic Backbone and Hydrophilic Branches. XXIII. Particle Size Control of Poly(ethylene glycol)-Coated Polystyrene Nanoparticles Prepared by Macromonomer Method", Journal of Polymer Science: Part A: Polymer Chemistry, vol. 37, pp. 2155-2166 (1999).

Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).

Chen, Wei et al., "Ultrahydrophobic and Ultrayophobic Surfaces: Some Comments and Examples", The ACS Journal of Surfaces and Colloids, vol. 15, No. 10, pp. 3395-3399 (May 11, 1999).

Cheng, Lin et al., "Efficient Synthesis of Unimolecular Polymeric Janus Nanoparticles and Their Unique Self-Assembly Behavior in a Common Solvent," Macromolecules, 41, pp. 8159-8166 (2008).

Coleman, Jr. Lester E. et al., "Reaction of Primary Aliphatic Amines with Maleic Anhydride", J. Org,. Chem., 24, 185, pp. 135-136 (1959).

Cosgrove, Terence et al., "Adsorbed Block Copolymer of Poly(2-vinylpyridine) and Polystyrene Studied by Neutron Reflectivity and Surface Force Techniques", Macromolecules, 26, pp. 4363-4367 (1993).

Coulson, S.R. et al., "Super-Repellent Composite Fluoropolymer Surfaces", The Journal of Physical Chemistry B, vol. 104, No. 37, pp. 8836-8840 (Sep. 21, 2000).

Cui, Honggang et al., "Block Copolymer Assembly via Kinetic Control", Science, vol. 317, pp. 647-650 (Aug. 3, 2007).

Dendukuri, Dhananjay et al., "Synthesis and Self-Assembly of Amphiphilic Polymeric Microparticles," Langmuir, 23, pp. 4669-4674 (2007).

Dieterich, W. et al., "Non-Debye Relaxations in Disordered Ionic Solids", Chem. Chys., 284, pp. 439-467 (2002).

Edmonds, William F. et al., "Disk Micelles from Nonionic Coil—Coil Diblock Copolymers", Macromolecules, vol. 39, pp. 4526-4530 (May 28, 2006).

Ege, Seyhan, Organic Chemistry Structure and Reactivity, 3rd Edition, p. 959 (1994).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

(56) References Cited

OTHER PUBLICATIONS

Erbil, H. Yildirim et al., "Transformation of a Simple Plastic into a Superhydrophobic Surface", Science, vol. 299, pp. 1377-1380 (Feb. 28, 2003).

Erhardt, Rainer et al., "Janus Micelles", Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Ferreira, Paula G. et al., "Scaling Law for Entropic Effects at Interfaces between Grafted Layers and Polymer Melts", Macromolecules, vol. 31, pp. 3994-4003 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Gay, C., "Wetting of a Polymer Brush by a Chemically Identical Polymer Melt", Macromolecules, vol. 30, pp. 5939-5943 (1997).

Giannelis, E.P. "Polymer Layered Silicate Nanocomposites", Advanced Materials, vol. 8, No. 1, pp. 29-35 (Jan. 1, 1996).

Gilman, Jeffrey W. et al., "Recent Advances in Flame Retardant Polymer Nanocomposites," Fire and Materials 2001, 7th International Conference and Exhibition. Proceedings, Interscience Communications Limited, San Antonio, TX, pp. 273-283, Jan. 22-24, 2001).

Greenwood, N.N. et al., Chemistry of the Elements, Pergaroen Press, New York, pp. 1126-1127 (1984).

Guo, Andrew et al., "Star Polymers and Nanospheres from Cross-Linkable Diblock Copolymers", Macromolecules, vol. 29, pp. 2487-2493 (Jan. 17, 1996).

Haeussler, L. et al., "Simultaneous TA and MS Analysis of Alternating Styrene-Malei Anhydride and Styrene-Maleimide Copolymers", Thermochim. Acta, 277, 14 (1996).

Halperin, A., "Polymeric Micelles: A Star Model", Macromolecules, vol. 20, pp. 2943-2946 (1987).

Hamley, Ian W., "The Physics of Block Copolymers", Oxford Science Publication: Oxford, Chapters 3 and 4, pp. 131-265, (1998).

Hardacre, Christopher et al., "Structure of molten 1,3-dimethylimidazolium chloride using neutron diffraction", Journal of Chemical Physics, vol. 118, No. 1, pp. 273-278 (2003).

Hasegawa, Ryuichi et al., "Optimum Graft Density for Dispersing Particles in Polymer Melts", Macromolecules, vol. 29, pp. 6656-6662 (1996).

Hay, J.N. et al., "A Review of Nanocomposites," 15 pp. (2000).

Ishizu, Koji et al., "Synthesis of Star Polymer with Nucleus of Microgel", Polymer Journal, vol. 12, No. 6, pp. 399-404 (1980).

Ishizu, Koji et al., "Core-Shell Type Polymer Microspheres Prepared from Block Copolymers", Journal of Polymer Science: Part C: Polymer Letters, vol. 26, pp. 281-284 (1988).

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

Ishizu, Koji et al., "Preparation of core-shell type polymer microspheres from anionic block copolymers", Polymer, vol. 34, No. 18, pp. 3929-3933 (1993).

Ishizu, Koji, "Synthesis and Structural Ordering of Core-Shell Polymer Microspheres", Prog. Polym. Sci., vol. 23, pp. 1383-1408 (1998).

Ishizu, Koji, "Star Polymers by Immobilizing Functional Block Copolymers", Star and Hyperbranched Polymers, ISBN 0-8247, pp. 135-178 (1999).

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Jensen, M. et al., "EXAFS Investigations of the Mechanism of Facilitated Ion Transfer into a Room-Temperature Ionic Liquid", J. Am. Chem. Soc., 124, pp. 10664-10665 (2002).

Kim, Woo-Sik et al., "Synthesis and Photocrosslinking of Maleimide-Type Polymers", Macromol. Rapid Commun., 17, 835, pp. 835-841 (1996).

Kralik, M. et al., "Catalysis by metal nanoparticles supported on functional organic polymers", Journal of Molecular Catalysis A: Chemical, vol. 177, pp. 113-138 (2001).

Kraus, Gerard, "Mechanical Losses in Carbon-Black-Filled Rubbers", Journal of Applied Polymer Science: Applied Polymer Symposium, vol. 39, pp. 75-92 (1984).

Krishnamoorti, Ramanan et al., "Rheology of End-Tethered Polymer Layered Silicate Nanocomposites", Macromolecules, 30, pp. 4097-4102 (1997).

Lagaly, Gehard, "Kink-Block and Gauche-Block Structures of Bimolecular Films", Chem. Int. Ed. Engl., vol. 15, No. 10, pp. 575-586 (1976).

Lawson, David F. et al., "Preparation and Characterization of Heterophase Blends of Polycaprolactam and Hydrogenated Polydienes", Central Research Journal of Applied Polymer Science, vol. 39, pp. 2331-2351 (1990).

Lee, Wen-Fu et al., "Polysulfobetaines and Corresponding Cationic Polymers. IV. Synthesis and Aqueous Solution Properties of Cationic Poly (MIQSDMAPM)", J. Appl. Pol. Sci., vol. 59, pp. 599-608 (1996).

Ligoure, Christian, "Adhesion between a Polymer Brush and an Elastomer: A Self-Consistent Mean Field Model", Macromolecules, vol. 29, pp. 5459-5468 (1996).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, Hongyang et al., "Reverse Atom Transfer Radical Polymerization of Methyl Methacrylate in Room-Temperature Ionic Liquids", Journal of Polymer Science: Part A: Polymer Chemistry, 41, pp. 143-151 (2003).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Mandema, et al., "Association of Block Copolymers in Selective Solvents, 1 Measurements on Hydrogenated Poly (styrene-isoprene) in Decane and in trans-Decalin", Makromol. Chem. 180, pp. 1521-1538 (1979).

Matsen, M.W., "Phase Behavior of Block Copolymer/Homopolymer Blends", Macromolecules, vol. 28, pp. 5765-5773 (1995).

Matsumoto, Akikazu et al., "Synthesis, Thermal Properties and Gas Permeability of Poly (N-n-alkylmaleimide)s", Polymer Journal, vol. 23, No. 3, pp. 201-209 (1991).

Mayer, A.B.R. et al., "Transition metal nanoparticles protected by amphiphilic block copolymers as tailored catalyst systems", Colloid Polym. Sci., 275, pp. 333-340 (1997).

Mendizabal, E. et al., "Functionalized Core-Shell Polymers Prepared by Microemulsion Polymerization", ANTEC 1997 Plastics: Plastics Saving Planet Earth, vol. 2: Materials Conference Proceedings, pp. 1733-1737.

Mi, Yongli et al., "Glass transition of nano-sized single chain globules", Polymer 43, Elsevier Science Ltd., pp. 6701-6705 (2002).

Milner, S.T. et al., "Theory of the Grafted Polymer Brush", Macromolecules, vol. 21, pp. 2610-2619 (1988).

Milner, S.T. et al., "End-Confined Polymers: Corrections to the Newtonian Limit", Macromolecules, vol. 22, pp. 489-490 (1989).

Moller, Martin et al., "Mineralization of Gold in Block Copolymer Micelles", Macromol. Symp., 117, pp. 207-218 (1997).

Mossmer, Stefan et al., "Solution Behavior of Poly(styrene)-block-poly(2-vinylpyridine) Micelles Containing Gold Nanoparticles", Macromolecules, 33, pp. 4791-4798 (2000).

Nace, Vaughn M., "Nonionic Surfactants: Polyoxyalkylene Block Copolymers", Surfactant Science Series, vol. 60, pp. 1-266 (1996).

(56) References Cited

OTHER PUBLICATIONS

Newkome George R. et al., "Dendrimers and Dendrons: Concept, Synthesis, Application", Wiley-VCH Verlag GmbH, pp. 45, 191-310 (2001).
Noolandi, Jaan et al., "Theory of Block Copolymer Micelles in Solution", Macromolecules, vol. 16, pp. 1443-1448 (1983).
O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).
O'Reilly, Rachel K. et al., "Cross-linked block copolymer micelles: functional nanostructures of great potential and versatility", Chem. Soc. Rev., vol. 35, pp. 1068-1083 (Oct. 2, 2006).
Okay, Oguz et al., "Anionic Dispersion Polymerization of 1,4-Divinylbenzene", Macromolecules, 23, pp. 2623-2628 (1990).
Okay, Oguz et al., "Steric stabilization of reactive microgels from 1,4-divinylbenzene", Makromol. Chem., Rapid Commun., vol. 11, pp. 583-587 (1990).
Oranli, Levent et al., "Hydrodynamic studies on micellar solutions of styrene-butadiene block copolymers in selective solvents", Can. J. Chem., vol. 63, pp. 2691-2696 (1985).
Piirma, Irja, "Polymeric Surfactants", Surfactant Science Series, vol. 42, pp. 1-289 (1992).
Pispas, S. et al., "Effect of Architecture on the Micellization Properties of Block Copolymers: A2B Miktoarm Stars vs AB Diblocks", Macromolecules, vol. 33, pp. 1741-1746 (Feb. 17, 2000).
Price, Colin, "Colloidal Properties of Block Copolymers", Applied Science Publishers Ltd., Chapter 2, pp. 39-80 (1982).
Quirk, Roderic P. et al., "Controlled Anionic Synthesis of Polyisoprene-Poly(2-vinylpyridine) Diblock Copolymers in Hydrocarbon Solution", Macromolecules, 34, pp. 1192-1197 (2001).
Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).
Rein, David H. et al., "Kinetics of arm-first star polymers formation in a non-polar solvent", Macromol. Chem. Phys., vol. 199, pp. 569-574 (1998).
Rempp, Paul et al., "Grafting and Branching of Polymers", Pure Appl. Chem., vol. 30, pp. 229-238 (1972).
Ren, Jiaxiang et al., "Linear Viscoelasticity of Disordered Polystyrene-Polyisoprene Block Copolymer Based Layered-Silicate Nanocomposites", Macromolecules, 33, pp. 3739-3746 (2000).
Riess, Gerard et al., "Block Copolymers", Encyclopedia of Polymer Science and Engineering, vol. 2, pp. 324-434 (1985).
Riess, Gerard, "Micellization of block copolymers", Progress in Polymer Science, vol. 28, pp. 1107-1170 (Jan. 16, 2003).
Robertson, C.G. et al., "Effect of structural arrest on Poisson's ratio in nanoreinforced elastomers," Physical Review E, vol. 75, pp. 051403-1 thru 051403-7 (2007).
Saito, Reiko et al., "Core-Shell Type Polymer Microspheres Prepared From Poly(Styrene-b-Methacrylic Acid)—1. Synthesis of Microgel ", Eur. Polym. J., vol. 27, No. 10, pp. 1153-1159 (1991).
Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).
Saito, Reiko et al., "Arm-number effect of core-shell type polymer microsphere: 1. Control of arm-number of microsphere", Polymer, vol. 35, No. 4, pp. 866-871 (1994).
Saito, Reiko et al., "Synthesis of Microspheres with Microphase-Separated Shells", Journal of Polymer Science: Part A: Polymer Chemistry, vol. 38, pp. 2091-2097 (2000).
Sakurai, Ryo et al., "68.2: Color and Flexible Electronic Paper Display using QR-LPD Technology", SID 06 Digest, pp. 1922-1925 (2006).
Schacher, Felix et al., "Multicompartment Core Micelles of Triblock Terpolymers in Organic Media," Macromolecules, 42, pp. 3540-3548 (2009).
Semenov, A.N., "Theory of Diblock-Copolymer Segregation to the Interface and Free Surface of a Homopolymer Layer", Macromolecules, vol. 25, pp. 4967-4977 (1992).
Semenov, A.N., "Phase Equilibria in Block Copolymer-Homopolymer Mixtures", Macromolecules, vol. 26, pp. 2273-2281 (1993).
Serizawa, Takeshi et al., "Transmission Electron Microscopic Study of Cross-Sectional Morphologies of Core-Corona Polymeric Nanospheres", Macromolecules, 33, pp. 1759-1764 (2000).
Shull, Kenneth R., "End-Adsorbed Polymer Brushes in High- and Low-Molecular-Weight Matrices", Macromolecules, vol. 29, pp. 2659-2666 (1996).
Simmons, Blake et al., "Templating Nanostructure trhough the Self-Assembly of Surfactants", Synthesis, Functionalization and Surface Treatment of Nanoparticles, ASP (Am.Sci.Pub.), pp. 51-52, 174-208 (2003).
Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).
Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).
Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).
Thurmond, K. Bruce et al., "Shell cross-linked polymer micelles: stabilized assemblies with great versatility and potential", Colloids and Surfaces B: Biointerfaces, vol. 16, pp. 45-54 (1999).
Tiyapiboonchaiya, Churat et al., "Polymer-m-Ionic-Liquid Electrolytes", Macromol. Chem. Phys., 203, pp. 1906-1911 (2002).
Tomalia, Donald A. et al., "Dendritic Macromolecules: Synthesis of Starburst Dendrimers", Macromolecules vol. 19, No. 9, pp. 2466-2468 (1986).
Tsitsilianis, Constantinos et al., "Synthesis and characterization of hetero-arm star copolymers", Makromol. Chem. 191, pp. 2319-2328 (1990).
Tuzar et al., "Anomalous Behaviour of Solutions of Styrene-Butadiene Block Copolymers in Some Solvents", Makromol. Chem. 178, 22743-2746 (1977).
Tuzar, Zdenek et al., "Micelles of Block and Graft Copolymers in Solutions", Surface and Colloid Science, vol. 15, Chapter 1, pp. 1-83 (1993).
Utiyama et al., "Light-Scattering Studies of a Polystyrene-Poly(methyl methacrylate) Two-Blcok Copolymer in Mixed Solvents", Macromolecules, vol. 7, No. 4, (Jul.-Aug. 1974).
Vamvakaki, M. et al., "Synthesis of novel block and statistical methacrylate-based ionomers containing acidic, basic or betaine residues", Polymer, vol. 39, No. 11, pp. 2331-2337 (1998).
van der Maarel, J.R.C. et al., "Salt-Induced Contraction of Polyelectrolyte Diblock Copolymer Micelles", Langmuir, vol. 16, No. 19, pp. 7510-7519 (2000).
Vermeesch, I. et al., "Chemical Modification of Poly (styrene-co-maleic anhydride) with Primary N-Alkylamines by Reactive Extrusion", J. Applied Polym. Sci., vol. 53, pp. 1365-1373 (1994).
Walther, Andreas et al., "Engineering Nanostructured Polymer Blends with Controlled Nanoparticle Location using Janus Particles," ACS Nano., 2(6), pp. 1167-1178 (2008).
Walther, Andreas et al., "Janus Particles," Soft Matter, 4, pp. 663-668 (2008).
Wang, Xiaorong et al., "Chain conformation in two-dimensional dense state", Journal of Chemical Physics, vol. 121, No. 16, pp. 8158-8162 (Oct. 22, 2004).
Wang, Xiaorong et al., "Strain-induced nonlinearity of filled rubbers", Physical Review E 72, 031406, pp. 1-9 (Sep. 20, 2005).
Pre-print article, Wang, Xiaorong et al., "PMSE 392—Manufacture and Commercial Uses of Polymeric Nanoparticles", Division of Polymeric Materials: Science and Engineering (Mar. 2006).
Wang, Xiaorong et al., "Manufacture and Commercial Uses of Polymeric Nanoparticles", Polymeric Materials: Science and Engineering, vol. 94, p. 659 (2006).
Wang, Xiaorong et al., "Heterogeneity of structural relaxation in a particle-suspension system", EPL, 79, 18001, pp. 1-5 (Jul. 2007).
Wang, Xiaorong et al., "Synthesis, Characterization, and Application of Novel Polymeric Nanoparticles", Macromolecules, 40, pp. 499-508 (2007).

(56) References Cited

OTHER PUBLICATIONS

Wang, Xiaorong et al., "Under microscopes the poly(styrene/butadiene) nanoparticles", Journal of Electron Microscopy, vol. 56, No. 6, pp. 209-216 (2007).
Wang, Xr. et al., "Fluctuations and critical phenomena of a filled elastomer under deformation", Europhysics Letters, vol. 75, No. 4, pp. 590-596 (Aug. 15, 2006).
Wang, Y. et al., "Janus-Like Polymer Particles Prepared via Internal Phase Separation from Emulsified Polymer/Oil Droplets," Polymer, vol. 50, No. 14, pp. 3361-3369 (2009).
Webber, Stephen E. et al., "Solvents and Self-Organization of Polymers", NATO ASI Series, Series E: Applied Sciences, vol. 327, pp. 1-509 (1996).
Whitmore, Mark Douglas et al., "Theory of Micelle Formation in Block Copolymer-Homopolymer Blends", Macromolecules, vol. 18, pp. 657-665 (1985).
Wijmans, C.M. et al., "Effect of Free Polymer on the Structure of a Polymer Brush and Interaction between Two Polymer Brushes", Macromolecules, vol. 27, pp. 3238-3248 (1994).
Wiley, John, "Quaternary Ammonium Compounds", Encyclopedia of Chem Tech., 4th Ed. vol. 20, pp. 739-767 (1996).
Wilson, D.J. et al., "Photochemical Stabilization of Block Copolymer Micelles", Eur. Polym. J., vol. 24, No. 7, pp. 617-621 (1988).
Witten, T.A. et al., "Stress Relaxation in the Lamellar Copolymer Mesophase", Macromolecules, vol. 23, pp. 824-829 (1990).
Wooley, Karen L, "From Dendrimers to Knedel-like Structures", Chem. Eur. J., 3, No. 9, pp. 1397-1399 (1997).
Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).
Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).
Worsfold, Denis J., "Anionic Copolymerization of Styrene with p-Divinylbenzene", Macromolecules, vol. 3, No. 5, pp. 514-517 (Sep.-Oct. 1970).
Zhang, Jian et al., "Bioconjugated Janus Particles Prepared by in Situ Click Chemistry," Chemistry of Materials, 21, pp. 4012-4018 (2009).
Zhao, Bin et al., "Mixed Polymer Brush-Grafted Particles: A New Class of Environmentally Responsive Nanostructured Materials," Macromolecules, 42, pp. 9369-9383 (2009).
Zheng, Lei et al., "Polystyrene Nanoparticles with Anionically Polymerized Polybutadiene Brushes", Macromolecules, 37, pp. 9954-9962 (2004).
Zilliox, Jean-Georges et al., "Preparation de Macromolecules a Structure en Etoile, par Copolymerisation Anionique", J. Polymer Sci.: Part C, No. 22, pp. 145-156 (1968).
Bridgestone Americas 2006 Presentation (14 pp.).
The Dow Chemical Company, "DVB Cross-link a variety of materials for improved thermal, physical, and chemical properties," 44 pp. (Jan. 2003).
Vulcanization Agents and Auxiliary Materials, Rubber Compounding, Kirk-Othmer, Encyclopedia of Chemical Technology, 3rd Ed., Wiley Interscience, NY, vol. 20. pp. 390-402 (1982).
Wang, Xiaorong et al., U.S. Appl. No. 10/791,049, filed Mar. 2, 2004 entitled "Method of Making Nano-Particles of Selected Size Distribution".
Wang, Xiaorong et al., U.S. Appl. No. 10/886,283, filed Jul. 6, 2004 entitled "Hydropobic Surfaces with Nanoparticles".
Wang, Xiaorong et al., U.S. Appl. No. 12/184,895, filed Aug. 1, 2008 entitled "Disk-Like Nanoparticles".
Lipman, Bernard, Mar. 26, 2002 Notice of Allowance from U.S. Appl. No. 09/970,830 (4 pp.).
Kiliman, Leszek B., Feb. 13, 2003 Office Action from U.S. Appl. No. 10/038,748 (3 pp.).
Kiliman, Leszek B., Aug. 25, 2003 Notice of Allowance from U.S. Appl. No. 10/038,748 (5 pp.).
Schutte, M., Nov. 13, 2003 International Search Report from PCT Application No. PCT/US02/31817 (3 pp.).
Harlan, Robert D., Mar. 17, 2004 Restriction/Election Office Action from U.S. Appl. No. 10/223,393 (6 pp.).
Lipman, Bernard, Mar. 24, 2004 Restriction/Election Office Action from U.S. Appl. No. 10/345,498 (5 pp.).
Lipman, Bernard, Mar. 25, 2004 Restriction/Election Office Action from U.S. Appl. No. 10/331,841 (6 pp.).
Schutte, M., May 28, 2004 International Search Report from PCT Application No. PCT/US03/40375 (3 pp.).
Harlan, Robert D., Jun. 22, 2004 Office Action from U.S. Appl. No. 10/223,393 (6 pp.).
Iraegui Retolaza, E., Jul. 9, 2004 International Search Report from PCT Application No. PCT/US2004/001000 (3 pp.).
Lipman, Bernard, Nov. 18, 2004 Notice of Allowance from U.S. Appl. No. 10/331,841 (5 pp.).
Lipman, Bernard, Nov. 23, 2004 Notice of Allowance from U.S. Appl. No. 10/345,498 (5 pp.).
Le, Hoa T., Dec. 14, 2004 Office Action from U.S. Appl. No. 10/791,491 (5 pp.).
Harlan, Robert D., Jan. 3, 2005 Notice of Allowance from U.S. Appl. No. 10/223,393 (6 pp.).
Le, Hoa T., Jul. 5, 2005 Office Action from U.S. Appl. No. 10/791,491 (9 pp.).
Russell, G., Aug. 1, 2005 International Search Report from PCT Application No. PCT/US2005/010352 (3 pp.).
Kiliman, Leszek B., Sep. 9, 2005 Office Action from U.S. Appl. No. 10/817,995 (7 pp.).
Raza, Saira B., Oct. 20, 2005 Office Action from U.S. Appl. No. 11/104,759 (10 pp.).
Harlan, Robert D., Nov. 7, 2005 Office Action from U.S. Appl. No. 11/117,981 (7 pp.).
Chen, Jizhuang, Dec. 30, 2005 Office Action from Chinese Application No. 02819527.2 (9 pp.).
Kiliman, Leszek B., Mar. 23, 2006 Office Action from U.S. Appl. No. 10/817,995 (7 pp.).
Choi, Ling Siu, Mar. 24, 2006 Office Action from U.S. Appl. No. 10/755,648 (11 pp.).
Le, Hoa T., Apr. 10, 2006 Notice of Allowance from U.S. Appl. No. 10/791,491 (5 pp.).
Asinovsky, Olga, Jun. 20, 2006 Office Action from U.S. Appl. No. 10/791,049 (11 pp.).
Harlan, Robert D., Jul. 20, 2006 Office Action from U.S. Appl. No. 11/117,981 (6 pp.).
Schutte, M., Aug. 8, 2006 Office Action from European Application No. 02807196.7 (5 pp.).
Raza, Saira B., Aug. 21, 2006 Office Action from U.S. Appl. No. 11/104,759 (6 pp.).
Chevalier, Alicia Ann, Sep. 6, 2006 Office Action from U.S. Appl. No. 10/886,283 (5 pp.).
Lipman, Bernard, Sep. 14, 2006 Office Action from U.S. Appl. No. 11/168,297 (4 pp.).
Lipman, Bernard., Sep. 29, 2006 Office Action from U.S. Appl. No. 11/058,156 (5 pp.).
Lipman, Bernard, Oct. 3, 2006 Notice of Allowance from U.S. Appl. No. 11/064,234 (5 pp.).
Mullis, Jeffrey C., Oct. 31, 2006 Office Action from U.S. Appl. No. 11/050,115 (6 pp.).
Choi, Ling Siu, Dec. 4, 2006 Notice of Allowance from U.S. Appl. No. 10/755,648 (9 pp.).
Kiliman, Leszek B., Dec. 13, 2006 Office Action from U.S. Appl. No. 10/817,995 (6 pp.).
Wyrozebski Lee, Katarzyna I., Dec. 19, 2006 Office Action from U.S. Appl. No. 10/872,731 (6 pp.).
Asinovsky, Olga, Dec. 22, 2006 Office Action from U.S. Appl. No. 10/791,049 (11 pp.).
Haider, Saira Bano, Dec. 22, 2006 Advisory Action from U.S. Appl. No. 11/104,759 (3 pp.).
Chevalier, Alicia Ann, Jan. 4, 2007 Office Action from U.S. Appl. No. 10/886,283 (8 pp.).
Ronesi, Vickey M., Jan. 8, 2007 Office Action from U.S. Appl. No. 10/791,177 (5 pp.).

(56) References Cited

OTHER PUBLICATIONS

Harlan, Robert D., Jan. 26, 2007 Office Action from U.S. Appl. No. 11/117,981 (8 pp.).
Lipman, Bernard, Mar. 2, 2007 Notice of Allowance from U.S. Appl. No. 11/168,297 (3 pp.).
Wyrozebski Lee, Katarzyna I., Mar. 7, 2007 Office Action from U.S. Appl. No. 10/872,731 (13 pp.).
Lipman, Bernard, Apr. 18, 2007 Supplemental Notice of Allowability from U.S. Appl. No. 11/168,297 (3 pp.).
Harlan, Robert D., May 3, 2007 Office Action from U.S. Appl. No. 10/791,177 (6 pp.).
Kiliman, Leszak B., May 15, 2007 Advisory Action from U.S. Appl. No. 10/817,995 (2 pp.).
Haider, Saira Bano, May 16, 2007 Office Action from U.S. Appl. No. 11/104,759 (9 pp.).
Lipman, Bernard, May 21, 2007 Notice of Allowance from U.S. Appl. No. 11/058,156 (3 pp.).
Asinovsky, Olga, Jun. 7, 2007 Office Action from U.S. Appl. No. 10/791,049 (11 pp.).
Chevalier, Alicia Ann, Jul. 2, 2007 Office Action from U.S. Appl. No. 10/886,283 (8 pp.).
Harlan, Robert D., Jul. 12, 2007 Office Action from U.S. Appl. No. 11/117,981 (6 pp.).
Asinovsky, Olga, Aug. 16, 2007 Advisory Action from U.S. Appl. No. 10/791,049 (2 pp.).
Lipman, Bernard, Aug. 28, 2007 Notice of Allowance from U.S. Appl. No. 11/058,156 (5 pp.).
Schutte, Maya, Sep. 3, 2007 Office Action from European Application No. 02807196.7 (2 pp.).
Wyrozebski Lee, Katarzyna I., Sep. 14, 2007 Office Action from U.S. Appl. No. 10/872,731 (9 pp.).
Harlan, Robert D., Oct. 18, 2007 Office Action from U.S. Appl. No. 10/791,177 (6 pp.).
Haider, Saira Bano, Oct. 30, 2007 Office Action from U.S. Appl. No. 11/104,759 (9 pp.).
Asinovsky, Olga, Nov. 28, 2007 Office Action from U.S. Appl. No. 10/791,049 (9 pp.).
Chen, Jizhuang, Dec. 21, 2007 Office Action from Chinese Application No. 02819527.2 (12 pp.).
Harlan, Robert D., Jan. 2, 2008 Office Action from U.S. Appl. No. 11/117,981 (6 pp.).
Chevalier, Alicia Ann, Jan. 4, 2008 Office Action from U.S. Appl. No. 10/886,283 (8 pp.).
Harlan, Robert D., Jan. 9, 2008 Advisory Action from U.S. Appl. No. 10/791,177 (3 pp.).
Maksymonko, John M., Feb. 20, 2008 Office Action from U.S. Appl. No. 11/305,279 (14 pp.).
Lipman, Bernard, Feb. 28, 2008 Notice of Allowance from U.S. Appl. No. 11/058,156 (5 pp.).
Harlan, Robert D., Mar. 7, 2008 Advisory Action from U.S. Appl. No. 10/791,177 (3 pp.).
Haider, Saira Bano, Mar. 19, 2008 Advisory Action from U.S. Appl. No. 11/104,759 (3 pp.).
Lipman, Bernard, Mar. 20, 2008 Office Action from U.S. Appl. No. 11/764,607 (4 pp.).
Mullis, Jeffrey C., Mar. 24, 2008 Office Action from U.S. Appl. No. 11/050,115 (10 pp.).
Kiliman, Leszak B., Apr. 2, 2008 Notice of Allowance from U.S. Appl. No. 10/817,995 (5 pp.).
Watanabe, Y., May 7, 2008 Office Action from Japanese Application No. 582224/2003 (5 pp.).
Asinovsky, Olga, May 21, 2008 Office Action from U.S. Appl. No. 10/791,049 (11 pp.).
Mettler, Rolf-Martin, May 27, 2008 International Search Report from PCT Application No. PCT/US2007/087869 (4 pp.).
Harlan, Robert D., May 28, 2008 Office Action from U.S. Appl. No. 10/791,177 (8 pp.).
Maksymonko, John M., May 28, 2008 Office Action from U.S. Appl. No. 11/642,802 (10 pp.).
Lipman, Bernard, May 29, 2008 Notice of Allowance from U.S. Appl. No. 11/058,156 (5 pp.).
Iraegui Retolaza, E., May 30, 2008 International Search Report from PCT Application No. PCT/US2007/026031 (4 pp.).
Maksymonko, John M., May 30, 2008 Office Action from U.S. Appl. No. 11/642,795 (12 pp.).
Maksymonko, John M., Jun. 11, 2008 Office Action from U.S. Appl. No. 11/642,124 (16 pp.).
Haider, Saira Bano, Jun. 12, 2008 Office Action from U.S. Appl. No. 11/104,759 (10 pp.).
Maksymonko, John M., Jun. 13, 2008 Office Action from U.S. Appl. No. 11/641,514 (7 pp.).
Maksymonko, John M., Jul. 17, 2008 Office Action from U.S. Appl. No. 11/305,281 (13 pp.).
Harlan, Robert D., Jul. 25, 2008 Office Action from U.S. Appl. No. 11/117,981 (8 pp.).
Asinovsky, Olga, Jul. 29, 2008 Advisory Action from U.S. Appl. No. 10/791,049 (3 pp.).
Watanabe, Y., Jul. 29, 2008 Office Action from Japanese Application No. 582224/2003 (17 pp.).
Maksymonko, John M., Aug. 6, 2008 Office Action from U.S. Appl. No. 11/305,279 (11 pp.).
Mullis, Jeffrey C., Aug. 21, 2008 Office Action from U.S. Appl. No. 11/050,115 (7 pp.).
Hammon, Andrew, Aug. 25, 2008 International Search Report from PCT Application No. PCT/US2008/068838 (4 pp.).
Kiliman, Leszek B., Sep. 5, 2008 Office Action from U.S. Appl. No. 10/817,995 (5 pp.).
Asinovsky, Olga, Sep. 11, 2008 Office Action from U.S. Appl. No. 10/791,049 (12 pp.).
Le, Hoa T., Sep. 25, 2008 Office Action from U.S. Appl. No. 11/612,554 (8 pp.).
Lipman, Bernard, Sep. 25, 2008 Notice of Allowance from U.S. Appl. No. 11/764,607 (3 pp.).
Chen, Jizhuang, Sep. 26, 2008 Office Action from Chinese Application No. 02819527.2 (4 pp.).
Mullis, Jeffrey C., Oct. 31, 2008 Office Action from U.S. Appl. No. 11/641,514 (10 pp.).
Russell, Graham, Nov. 4, 2008 Office Action from European Application No. 05742316.2 (2 pp.).
Mullis, Jeffrey C., Nov. 5, 2008 Advisory Action from U.S. Appl. No. 11/050,115 (4 pp.).
Haider, Saira Bano, Dec. 2, 2008 Office Action from U.S. Appl. No. 11/104,759 (10 pp.).
Cain, Edward J., Dec. 9, 2008 Final Office Action from U.S. Appl. No. 11/642,795 (6 pp.).
Harlan, Robert D., Dec. 10, 2008 Final Office Action from U.S. Appl. No. 10/791,177 (8 pp.).
Mulcahy, Peter D., Dec. 11, 2008 Restriction/Election Office Action from U.S. Appl. No. 11/642,802 (7 pp.).
Johnson, Edward M., Dec. 12, 2008 International Search Report from PCT Application No. PCT/US2007/074611 (5 pp.).
Cain, Edward J., Dec. 31, 2008 Notice of Allowance from U.S. Appl. No. 11/642,124 (5 pp.).
Harlan, Robert D., Jan. 9, 2009 Office Action from U.S. Appl. No. 11/117,981 (6 pp.).
Lipman, Bernard, Jan. 14, 2009 Notice of Allowance from U.S. Appl. No. 11/058,156 (5 pp.).
Lipman, Bernard, Jan. 27, 2009 Notice of Allowance from U.S. Appl. No. 11/764,607 (4 pp.).
Haider, Saira Bano, Mar. 3, 2009 Advisory Action from U.S. Appl. No. 11/104,759 (3 pp.).
Harlan, Robert D., Mar. 11, 2009 Notice of Allowance from U.S. Appl. No. 10/791,177 (8 pp.).
Mullis, Jeffrey C., Mar. 11, 2009 Office Action from U.S. Appl. No. 10/791,049 (9 pp.).
Sykes, Altrev C., Mar. 20, 2009 Office Action from U.S. Appl. No. 11/818,023 (27 pp.).
Pak, Hannah J., Apr. 2, 2009 Office Action from U.S. Appl. No. 11/941,128 (9 pp.).
Harlan, Robert D., Apr. 30, 2009 Office Action from U.S. Appl. No. 11/117,981 (7 pp.).

(56) References Cited

OTHER PUBLICATIONS

Mullis, Jeffrey C., Apr. 30, 2009 Final Office Action from U.S. Appl. No. 11/641,514 (11 pp.).
Peets, Monique R., May 11, 2009 Restriction/Election Office Action from U.S. Appl. No. 11/697,801 (6 pp.).
Mulcahy, Peter D., May 13, 2009 Office Action from U.S. Appl. No. 11/642,802 (7 pp.).
Mullis, Jeffrey C., May 19, 2009 Advisory Action from U.S. Appl. No. 10/791,049 (5 pp.).
Zemel, Irina Sopja, May 28, 2009 Office Action from U.S. Appl. No. 11/305,279 (7 pp.).
Mullis, Jeffrey C., Jul. 15, 2009 Advisory Action from U.S. Appl. No. 11/641,514 (4 pp.).
Peets, Monique R., Jul. 20, 2009 Office Action from U.S. Appl. No. 11/697,801 (9 pp.).
Haider, Saira Bano, Sep. 11, 2009 Examiner's Answer from U.S. Appl. No. 11/104,759 (9 pp.).
Harlan, Robert D., Sep. 29, 2009 Final Office Action from U.S. Appl. No. 11/117,981 (6 pp.).
Sykes, Altrev C., Oct. 16, 2009 Office Action from U.S. Appl. No. 11/818,023 (20 pp.).
Mulcahy, Peter D., Nov. 9, 2009 Final Office Action from U.S. Appl. No. 11/642,802 (6 pp.).
Mullis, Jeffrey C., Nov. 9, 2009 Office Action from U.S. Appl. No. 11/641,514 (9 pp.).
Kiliman, Leszek B., Nov. 13, 2009 Office Action from U.S. Appl. No. 10/817,995 (6 pp.).
Chevalier, Alicia Ann, Nov. 25, 2009 Office Action from U.S. Appl. No. 10/886,283 (7 pp.).
Zemel, Irina Sopja, Dec. 3, 2009 Final Office Action from U.S. Appl. No. 11/305,279 (10 pp.).
Harlan, Robert D., Dec. 4, 2009 Notice of Allowance from U.S. Appl. No. 11/117,981 (5 pp.).
Mullis, Jeffrey C., Dec. 18, 2009 Supplemental Notice of Allowability from U.S. Appl. No. 11/050,115 (2 pp.).
Harlan, Robert D., Dec. 28, 2009 Office Action from U.S. Appl. No. 12/504,255 (6 pp.).
Harlan, Robert D., Dec. 29, 2009 Notice of Allowance from U.S. Appl. No. 10/791,177 (6 pp.).
Peets, Monique R., Jan. 5, 2010 Final Office Action from U.S. Appl. No. 11/697,801 (9 pp.).
Pak, Hannah J., Jan. 6, 2010 Final Office Action from U.S. Appl. No. 11/941,128 (10 pp.).
Wheeler, Thurman Michael, Feb. 8, 2010 Office Action from U.S. Appl. No. 11/642,796 (13 pp.).
Sykes, Altrev C., Apr. 5, 2010 Final Office Action from U.S. Appl. No. 11/818,023 (24 pp.).
Peets, Monique R., Apr. 15, 2010 Notice of Allowance from U.S. Appl. No. 11/697,801 (5 pp.).
Pak, Hannah J., Apr. 30, 2010 Notice of Allowance from U.S. Appl. No. 11/941,128 (11 pp.).
Mullis, Jeffrey C., May 26, 2010 Final Office Action from U.S. Appl. No. 11/641,514 (8 pp.).
Ducheneaux, Frank D., Jun. 8, 2010 Final Office Action from U.S. Appl. No. 10/817,995 (19 pp.).
Harlan, Robert D., Jun. 9, 2010 Office Action from U.S. Appl. No. 12/504,255 (6 pp.).
Chevalier, Alicia Ann, Jul. 8, 2010 Advisory Action from U.S. Appl. No. 10/886,283 (3 pp.).
Wheeler, Thurman Michael, Jul. 30, 2010 Final Office Action from U.S. Appl. No. 11/642,796 (15 pp.).
Mullis, Jeffrey C., Aug. 12, 2010 Advisory Action from U.S. Appl. No. 11/641,514 (4 pp.).
Mensah, Laure, Sep. 20, 2010 Office Action from European Application No. 07813483.0 (4 pp.).
Egwim, Kelechi Chidi, Sep. 30, 2010 Office Action from U.S. Appl. No. 12/047,896 (6 pp.).
Mullis, Jeffrey C., Oct. 8, 2010 Notice of Allowance from U.S. Appl. No. 11/641,514 (2 pp.).
Sykes, Altrev C., Oct. 29, 2010 Examiner's Answer from U.S. Appl. No. 11/818,023 (24 pp.).
Chevalier, Alicia Ann, Nov. 23, 2010 Office Action from U.S. Appl. No. 10/886,283 (6 pp.).
Harlan, Robert D., Dec. 1, 2010 Notice of Allowance from U.S. Appl. No. 12/504,255 (6 pp.).
Ducheneaux, Frank D., Dec. 28, 2010 Final Office Action from U.S. Appl. No. 10/817,995 (24 pp.).
Haider, Saira Bano, Feb. 9, 2011 Decision on Appeal from U.S. Appl. No. 11/104,759 (4 pp.).
Mullis, Jeffrey C., Feb. 9, 2011 Restriction/Election Office Action from U.S. Appl. No. 12/288,174 (8 pp.).
Egwim, Kelechi Chidi, Mar. 21, 2011 Final Office Action from U.S. Appl. No. 12/047,896 (6 pp.).
Mullis, Jeffrey C., Mar. 30, 2011 Decision on Appeal from U.S. Appl. No. 10/791,049 (7 pp.).
Ducheneaux, Frank D., Apr. 4, 2011 Advisory Action from U.S. Appl. No. 10/817,995 (6 pp.).
Rosenberg, Nancy D., Apr. 12, 2011 Notice of Allowance from U.S. Appl. No. 10/886,283 (4 pp.).
Brovkina, T.A., English translation of May 4, 2011 Office Action from Russian Application No. 2009107218 (7 pp.).
Mullis, Jeffrey C., May 23, 2011 Office Action from U.S. Appl. No. 12/288,174 (6 pp.).
Wheeler, Thurman Michael, May 31, 2011 Office Action from U.S. Appl. No. 11/642,796 (12 pp.).
Mullis, Jeffrey C., Jun. 3, 2011 Restriction/Election Office Action from U.S. Appl. No. 12/374,883 (7 pp.).
Egwim, Kelechi Chidi, Jun. 13, 2011 Advisory Action from U.S. Appl. No. 12/047,896 (2 pp.).
Xia, Lanying, Jul. 6, 2011 Office Action with English translation from Chinese Application No. 200780047895.2 (8 pp.).
Mullis, Jeffrey C., Jul. 27, 2011 Office Action from U.S. Appl. No. 12/374,883 (13 pp.).
Brovkina, T.A., Oct. 12, 2011 Office Action with English translation from Russian Application No. 2009107218 (8 pp.).
Chinese Patent Office, Nov. 3, 2011 Office Action with English translation from Chinese Application No. 200780036040.X (12 pp.).
Mulcahy, Peter D., Nov. 9, 2011 Office Action from U.S. Appl. No. 11/642,802 (6 pp.).
Fink, Brieann R., Dec. 1, 2011 Office Action from U.S. Appl. No. 12/754,367 (15 pp.).
Mullis, Jeffrey C., Feb. 1, 2012 Office Action from U.S. Appl. No. 12/374,883 (9 pp.).
Boletti, Cesare, Apr. 18, 2012 Office Action from European Application No. 08772275.7 (3 pp.).
Zemel, Irina Sopja, Apr. 30, 2012 Decision on Appeal from U.S. Appl. No. 11/305,279 (12 pp.).
Wang, Chun Cheng, May 4, 2012 Office Action from U.S. Appl. No. 12/555,183 (9 pp.).
Min, Ke et al., "Atom Transfer Radical Dispersion Polymerization of Styrene in Ethanol," Macromolecules, vol. 40, pp. 7217-7222 (2007).
Papadopoulos, P. et al., "Origin of Glass Transition of Poly(2-vinylpyridine). A Temperature- and Pressure-Dependent Dielectric Spectroscopy Study," Macromolecules, vol. 37, pp. 8116-8122 (2004).
Schwab, F.C. et al., "Anionic Dispersion Polymerization of Styrene," Advances in Polymer Synthesis, vol. 31, pp. 381-404 (1985).
Kaucher, Mark S., Nov. 5, 2012 Office Action from U.S. Appl. No. 12/979,732 (24 pp.).
Wheeler, Thurman Michael, Nov. 6, 2012 Office Action from U.S. Appl. No. 11/642,796 (14 pp.).
Sykes, Altrev C., Nov. 8, 2012 Final Office Action from U.S. Appl. No. 11/818,023 (20 pp.).
Wang, Chun Cheng, Nov. 9, 2012 Notice of Allowance from U.S. Appl. No. 12/555,183 (5 pp.).
Mulcahy, Peter D., Dec. 6, 2012 Final Office Action from U.S. Appl. No. 11/642,802 (7 pp.).
Kaucher, Mark S., Dec. 18, 2012 Office Action from U.S. Appl. No. 13/142,770 (19 pp.).
Russian Patent Office, Jan. 16, 2013 Office Action from Russian Application No. 2010102943 (5 pp.).

(56) References Cited

OTHER PUBLICATIONS

Wang, Chun Cheng, Feb. 1, 2013 Notice of Allowance from U.S. Appl. No. 12/555,183 (6 pp.).
Chinese Patent Office, Feb. 25, 2013 Office Action from Chinese Application No. 200880102778.6 (3 pp.).
Nakamura, Eiji, Mar. 26, 2013 Office Action with English translation from Japanese Application No. 2009-522021 (9 pp.).
Giesemann, Gerhard, Apr. 8, 2013 Office Action from European Application No. 08772275.7 (4 pp.).
Peets, Monique R., Apr. 11, 2013 Office Action from U.S. Appl. No. 12/979,719 (6 pp.).
Zemel, Irina Sopja, May 31, 2013 Office Action from U.S. Appl. No. 11/305,279 (9 pp.).
Inoue, M., Jun. 4, 2013 Office Action with English translation from Japanese Application No. 2009-543130 (6 pp.).
Chinese Patent Office, Jun. 28, 2013 Office Action with English translation from Chinese Application No. 200980157756.4 (13 pp.).
Chinese Patent Office, Sep. 4, 2013 Office Action with English translation from Chinese Application No. 200780036040.X (18 pp.).
Sykes, Altrev C., Sep. 5, 2013 Office Action from U.S. Appl. No. 11/818,023 (22 pp.).
Zemel, Irina Sophia, Sep. 30, 2013 Final Office Action from U.S. Appl. No. 11/305,279 (7 pp.).
Fink, Brieann R., Sep. 30, 2013 Office Action from U.S. Appl. No. 12/754,367 (14 pp.).
Uchida, Y., Oct. 1, 2013 Office Action with English translation from Japanese Application No. 2010-515229 (9 pp.).
Peets, Monique R., Nov. 5, 2013 Final Office Action from U.S. Appl. No. 12/979,719 (9 pp.).
Korean Patent Office, Nov. 28, 2013 Office Action from Korean Application No. 10-2009-7004191 (7 pp.).
Chinese Patent Office, Dec. 4, 2013 Office Action from Chinese Application No. 200980157756.4 (8 pp.).
Mulcahy, Peter D., Dec. 10, 2013 Notice of Allowance from U.S. Appl. No. 11/642,802 (2 pp.).
Zemel, Irina Sophia, Jan. 3, 2014 Advisory Action from U.S. Appl. No. 11/305,279 (3 pp.).
Kaucher, Mark S., Jan. 31, 2014 Final Office Action from U.S. Appl. No. 13/142,770 (8 pp.).
Nakamura, Eiji, Feb. 12, 2014 Office Action with English translation from Japanese Application No. 2009-522021 (11 pp.).
Sykes, Altrev C., Feb. 14, 2014 Final Office Action from U.S. Appl. No. 11/818,023 (26 pp.).
Korean Patent Office, Feb. 27, 2014 Office Action with English translation from Korean Application No. 10-2009-7014949 (10 pp.).
Peets, Monique R., Mar. 11, 2014 Final Office Action from U.S. Appl. No. 12/979,719 (9 pp.).
Fink, Brieann R., Apr. 23, 2014 Office Action from U.S. Appl. No. 12/754,367 (30 pp.).
Kaucher, Mark S., May 19, 2014 Notice of Allowance from U.S. Appl. No. 13/142,770 (4 pp.).
Okazaki, Tadashi, May 20, 2014 Office Action with English translation from Japanese Application No. 2011-544583 (9 pp.).
Zemel, Irina Sopjia, Jun. 6, 2014 Office Action from U.S. Appl. No. 11/305,279 (10 pp.).

\* cited by examiner

Looped conformation

Extended conformation

DISK-LIKE NANOPARTICLES

This application is a continuation of U.S. application Ser. No. 12/288,174, filed on Oct. 17, 2008, which, in turn is a continuation-in-part of U.S. application Ser. No. 12/184,895, filed Aug. 1, 2008, which, in turn, is a continuation-in-part of U.S. application Ser. No. 11/641,514, published as U.S. 2007/0149649, filed Dec. 19, 2006, which, in turn, claims the benefit of U.S. Provisional Application No. 60/751,602, filed Dec. 19, 2005. Each of these applications are incorporated herein by reference.

SUMMARY AND BACKGROUND

The present disclosure is generally related to polymer nanoparticles. More particularly, the present disclosure provides polymer nanoparticles comprising tri-block copolymer chains that form a particular formation or shape.

Over the past several years, polymer nanoparticles have attracted increased attention not only in the technical fields such as catalysis, combinatorial chemistry, protein supports, magnets, and photonics, but also in the manufacture of rubbery products such as tires. For example, nanoparticles can modify rubbers by uniformly dispersing throughout a host rubber composition as discrete particles. The physical properties of rubber such as moldability and tenacity can often be improved through such modifications. Moreover, some polymeric nanoparticles may serve as a reinforcement material for rubber. For example, polymer nano-strings are capable of dispersing evenly throughout a rubber composition, while maintaining a degree of entanglement between the individual nano-strings, leading to improved reinforcement over traditional reinforcing fillers.

However, an indiscriminate addition of nanoparticles to rubber may cause degradation of the matrix rubber material. Rather, very careful control and selection of nanoparticles having suitable architecture, size, shape, material composition, and surface chemistry, etc., are needed to improve the rubber matrix characteristics. For example, properties of polymeric nanoparticles made from diblock copolymer chains are controlled by the thermodynamics of diblock copolymers in a selected solvent. The thermodynamic phase diagram of those systems usually depends on two factors, the volume fractions of the components ($\Phi_i$, i=1, 2, 3 . . . ) and the miscibility between them ($\chi_{ij}N_i$ parameter between components). Therefore, for a given system, i.e., when the $\chi_{ij}N_i$ parameters between components are fixed, the formation of micelle structures depends primarily on the volume fraction of each component ($\Phi_i$, i=1, 2, 3 . . . ). In order to obtain a micelle nanoparticle of desired structure, the concentration or the volume fraction must be controlled. Flexibility of concentration adjustment is usually small due to the underlying thermodynamic laws and the phase diagrams. As such, it cannot provide high flexibility in concentration variations. This could raise unwelcome constraints in industrial processes.

Advantageously, the present disclosure provides a disk-like nanoparticle including a core layer that comprises a cross-linked multi-vinyl substituted aromatic hydrocarbon and a shell layer that comprises tri-block copolymer chains, each having a first, a second, and a third block. The first and third blocks of the tri-block copolymer chains comprise a vinyl aromatic monomer and are crosslinked with the core. The second block comprises a conjugated diene monomer units and comprises the top and bottom axial surfaces of the disk-like nanoparticle. The weight ratio of the monomer comprising the first block and third block to the monomer comprising the second block is 1:1 to 100:1.

A rubber composition comprising a rubber matrix and the disk-like nanoparticle disclosed above is also provided. A tire comprising the rubber composition is also described herein.

A method for making a disk-like nanoparticle in a liquid hydrocarbon medium is also provided. The nanoparticle has a core layer and a shell layer, the shell layer comprises tri-block copolymer chains having a first block, a second block, and a third block. The method comprises the steps of: polymerizing conjugated diene monomers with a multi-functional lithiated amine containing initiator, wherein the initiator is a hydrocarbon solvent soluble, anionic polymerization multi-lithio amine initiators that comprises at least two or more lithio amines in one molecule and has the general formula:

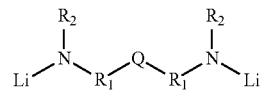

wherein Q is (a) an element selected from the group consisting of O, S, N, P and Si or (b) an alkylene group having from 1 to 20 methylene groups, and $R_1$ and $R_2$ are the same or different and are selected from the group consisting of alkyls, cycloalkyls and aralkyls containing from 1 to 20 carbon atoms; copolymerizing vinyl aromatic monomers to form the first and third blocks, thereby producing the tri-block copolymer chains; assembling the tri-block copolymer chains in the liquid hydrocarbon medium to form micelle structures; and crosslinking a multiple-vinyl-substituted aromatic hydrocarbon with the tri-block copolymer chains in the micelle structures to form a cross-linked core and to form polymer nanoparticles.

A disk-like nanoparticle produced from the method described above is also presented.

In another embodiment, a disk-like nanoparticle includes a core layer comprising a cross-linked multi-vinyl substituted aromatic hydrocarbon, and a shell layer comprising A-B-C tri-block copolymer chains, each having a first, a second, and a third block. The first block of the A-B-C tri-block copolymer chains includes a vinyl aromatic monomer and is crosslinked with the core. The second block includes a conjugated diene monomer, and the third block comprises the top and bottom axial surfaces of the disk-like nanoparticle. The disk-like nanoparticle further includes a residue of a multi-functional lithiated amine-containing initiator, wherein the initiator is a hydrocarbon solvent soluble, anionic polymerization multi-lithio amine initiators that comprises at least two or more lithio amines in one molecule and has the general formula:

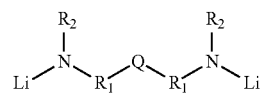

wherein Q is (a) an element selected from the group consisting of O, S, N, P and Si or (b) an alkylene group having from 1 to 20 methylene groups, divalent and $R_1$ and $R_2$ are the same or different and are selected from the group consisting of alkyls, cycloalkyls and aralkyls containing from 1 to 20 carbon atoms.

BRIEF DESCRIPTION OF THE DRAWINGS

The drawings are only for purposes of illustrating embodiments and are not to be construed as limiting the invention. In the drawings appended hereto.

DETAILED DESCRIPTION

Figure 1:
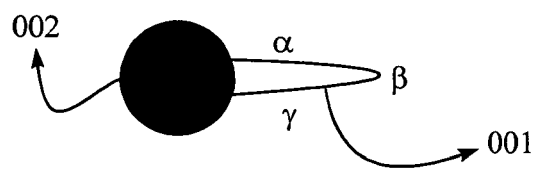
FIG. 1 illustrates two possible conformations of a tri-block copolymer chain in polymer nanoparticles.
Figure 1:
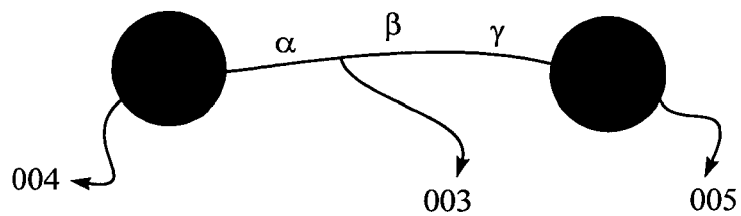

It is to be understood herein, that if a "range" or "group" is mentioned with respect to a particular characteristic of the present invention, for example, molecular weight, ratio, percentage, chemical group, and temperature etc., it relates to and explicitly incorporates herein each and every specific member and combination of sub-ranges or sub-groups therein whatsoever. Thus, any specified range or group is to be understood as a shorthand way of referring to each and every member of a range or group individually as well as each and every possible sub-range or sub-group encompassed therein; and similarly with respect to any sub-ranges or sub-groups therein. Furthermore, the terms "a" and "the," as used herein mean "one or more."

In an embodiment, non-spherical polymer nanoparticles are formed from tri-block copolymer chains of the following formula (I):

(I)

wherein A comprises a conjugated diene monomer; B comprises a vinyl aromatic monomer; a is an integer of from 1 to 100,000 and $b_1 \approx b_2$ and each of them is an integer of from 1 to 100,000, such as from 1 to 10,000.

By $b_1 \approx b_2$, it is intended that the value $\Delta$ calculated from the following equation ranges from 0 to 20%, such as from 0 to 10%, or from 0 to 5%.

$$\Delta = \frac{|b_1 - b_2|}{b_1 + b_2} \times 100\%$$

For simplicity, the terms of "Block α", "Block β", and "Block γ" are hereinafter used to denote the three blocks of the tri-block copolymer respectively as shown below:

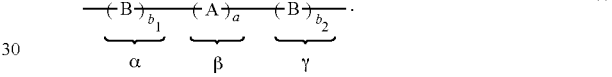

(I)

The tri-block copolymers and the polymer nanoparticles are formed through living anionic polymerization, although emulsion polymerization may also be contemplated. The method of synthesis can be a multi-stage anionic polymerization. Multi-stage anionic polymerizations have been conducted to prepare block-copolymers, for example in U.S. Pat. No. 4,386,125, which is incorporated herein by reference. Other relevant publications include U.S. Pat. Nos. 6,437,050 and 6,875,818, and U.S. Patent Application 2005/0154117, all of which are incorporated herein by reference.

The nanoparticles are formed from tri-block copolymer chains comprising Block α, Block β, and Block γ. Living blocks such as blocks α and blocks γ may be crosslinked with a multiple-vinyl-substituted aromatic hydrocarbon to form the desired polymer nanoparticles. The polymer nanoparticles may retain their discrete nature with little or no polymerization between each other. The nanoparticles can be substantially monodisperse and uniform in shape.

According to one embodiment, a tri-block copolymer is formed of vinyl aromatic hydrocarbon monomer and conjugated diene monomer in a hydrocarbon medium. The liquid hydrocarbon medium functions as the dispersion solvent, and may be selected from any suitable aliphatic hydrocarbons, alicyclic hydrocarbons, or mixture thereof, with a proviso that it exists in liquid state during the nanoparticles' formation procedure. Exemplary aliphatic hydrocarbons include, but are not limited to, pentane, isopentane, 2,2 dimethyl-butane, hexane, heptane, octane, nonane, decane, and the like. Exemplary alicyclic hydrocarbons include, but are not limited to, cyclopentane, methyl cyclopentane, cyclohexane, methyl cycloheptane, cycloheptane, cyclooctane, cyclononane, cyclodecane, and the like. These hydrocarbons may be used individually or in combination. In one embodiment, the liquid hydrocarbon medium is hexane.

In one embodiment, the polymerization of monomers into the tri-block copolymer is initiated via addition of divalent anionic initiators that are known in the art as useful in the copolymerization of diene monomers and vinyl aromatic hydrocarbons. Such initiators can be selected from organic compounds comprising two lithium groups as represented by the formula as shown below:

wherein R is a hydrocarbon group having 2 valences. R generally contains 4 to 30 carbon atoms per R group.

In a variety of exemplary embodiments, a bi-functional anionic initiator may have a general formula (L) as shown below:

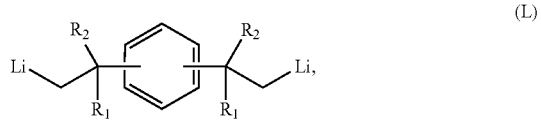

(L)

in which $R_1$ is hydrogen or methyl; and $R_2$ includes aliphatic radicals and cycloaliphatic radicals, such as alkyl, cycloalkyl, cycloalkylalkyl, alkylcycloalkyl, alkenyl, as well as aryl and alkylaryl radicals. Specific examples of $R_2$ groups include, but are not limited to, alkyls such as methyl, ethyl, n-propyl, isopropyl, n-butyl, isobutyl, t-butyl, sec-butyl, n-amyl, isoamyl, n-hexyl, n-octyl, n-decyl, and the like; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, and the like; cycloalkylalkyls such as cyclopentyl-methyl, cyclohexyl-ethyl, cyclopentyl-ethyl, methyl-cyclopentylethyl, 4-cyclohexylbutyl, and the like; alkenyls such as vinyl, propenyl, and the like; arylalkyls such as 4-phenylbutyl; aryls and alkylaryls such as phenyl, naphthyl, 4-butylphenyl, p-tolyl, and the like.

For example, $R_1$ and $R_2$ in formula (L) can be methyl and sec-butyl respectively; and the bi-functional anionic initiator has the formula (L-1) as shown below:

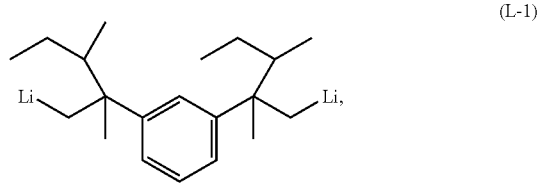

(L-1)

The formula (L-1) bi-functional anionic initiator may be prepared, for example, according to the following reaction:

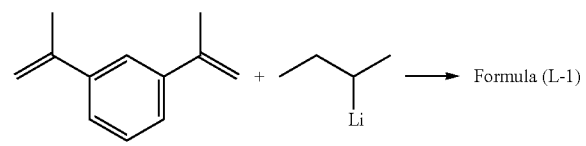

Other bi-functional anionic initiators include, but are not limited to, 1,4-dilithiobutane, 1,5-dilithiopetane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, and the like, and mixtures thereof.

The bi-functional anionic initiator may be used singly, or may be combined with additional bi-functional anionic initiators to initiate the polymerization of conjugated diene monomers A into Block β. It should be understood that typically the bi-functional anionic initiator residue is present in approximately the central region of Block β. For example, an exemplary living block β may be represented as shown below:

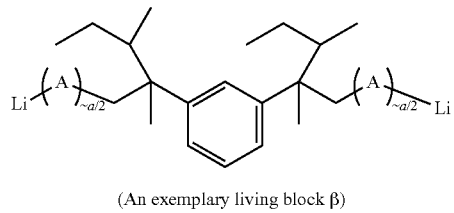

(An exemplary living block β)

Any suitable conjugated diene or mixture thereof may be used as monomer A and be polymerized into Block β via the bi-functional anionic initiator. For example, the conjugated diene may be selected from conjugated 1,3-diene monomer represented by the formula (II) as shown below:

Formula (II)

in which $R_5$, $R_6$, $R_7$, and $R_8$ are each independently selected from the group consisting of hydrogen, methyl, ethyl, propyl, and isopropyl.

Specific examples of the conjugated diene monomers A include, but are not limited to, 1,3-butadiene, isoprene (2-methyl-1,3-butadiene), cis- and trans-piperylene (1,3-pentadiene), 2,3-dimethyl-1,3-butadiene, 1,3-pentadiene, cis- and trans-1,3-hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the like, and the mixture thereof. In certain embodiments, 1,3-butadiene, isoprene, or combination thereof are used as the conjugated diene monomer A.

The polymerization of conjugated diene monomers A into Block β may last as long as necessary until the reaction is completed and a desired degree of polymerization, i.e. "a" in Formula (I), is obtained. The polymerization reaction of this step may last typically from 0.1 hours to 10 hours, such as from 0.2 hours to 8 hours, or from 0.2 hours to 4 hours. In exemplified embodiments, the polymerization reactions of this step lasted 1.5 hours.

The anionic polymerization to form Block β may be conducted in the presence of a modifier or a 1,2-microstructure controlling agent, so as to, for example, increase the reaction rate, equalize the reactivity ratio of monomers, and/or control the 1,2-microstructure in the conjugated diene monomers A. Suitable modifiers include, but are not limited to, triethylamine, tri-n-butylamine, hexamethylphosphoric acid triamide, N, N, N', N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, tri-n-butylphosphine, p-dioxane, 1,2 dimethoxy ethane, dimethyl ether, methyl ethyl ether, ethyl propyl ether, di-n-propyl ether, di-n-octyl ether, anisole, dibenzyl ether, diphenyl ether, dimethylethylamine, bix-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), bistetrahydrofuryl propane, and the like.

In certain embodiments, the anionic polymerization to form Block β can be conducted in the presence of an amine compound such as triethyl amine, trimethyl amine, tripropyl amine, tri-isopropyl amine, tri-n-butyl amine, and the like, and the mixtures thereof.

Other modifiers or 1,2-microstructure controlling agents used may be linear oxolanyl oligomers represented by the structural formula (IV) and cyclic oligomers represented by the structural formula (V), as shown below:

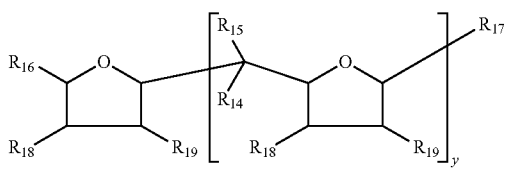

Formula (IV)

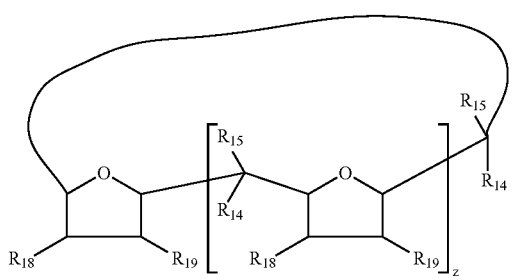

Formula (V)

wherein $R_{14}$ and $R_{15}$ are independently hydrogen or a $C_1$-$C_8$ alkyl group; $R_{16}$, $R_{17}$, $R_{18}$, and $R_{19}$ are independently hydrogen or a $C_1$-$C_6$ alkyl group; y is an integer of 1 to 5 inclusive, and z is an integer of 3 to 5 inclusive.

Specific examples of modifiers or 1,2-microstructure controlling agents include, but are not limited to, oligomeric oxolanyl propanes (OOPs); 2,2-bis-(4-methyl dioxane); bis (2-oxolanyl)methane; 1,1-bis(2-oxolanyl)ethane; bistetrahydrofuryl propane; 2,2-bis(2-oxolanyl)propane; 2,2-bis(5-methyl-2-oxolanyl)propane; 2,2-bis-(3,4,5-trimethyl-2-oxolanyl)propane; 2,5-bis(2-oxolanyl-2-propyl)oxolane; octamethylperhydrocyclotetrafurfurylene (cyclic tetramer); 2,2-bis(2-oxolanyl)butane; and the like. A mixture of two or more modifiers or 1,2-microstructure controlling agents may also be used.

The vinyl aromatic monomers B include, but are not limited to, styrene, α-methyl-styrene, 1-vinyl naphthalene, 2-vinyl naphthalene, vinyl toluene, methoxystyrene, t-butoxystyrene, and the like; as well as alkyl, cycloalkyl, aryl, alkaryl, and aralkyl derivatives thereof, in which the total number of carbon atoms in the monomer is generally not greater than 18; and mixtures thereof. In exemplified embodiments, the vinyl aromatic monomer B comprises styrene.

Copolymerizing vinyl aromatic monomers B with the living block β starts at both living ends of Block β. Block α and Block γ may thus be formed in two directions, obtaining a tri-block copolymer comprising Block α, Block β, and Block γ, as shown in Formula (I).

Without being bound to any theory, it is believed that Block β is more soluble or miscible in a selected liquid hydrocarbon medium than Blocks α and γ, facilitating the subsequent micelle-like assembling and nanoparticle formation from the tri-block copolymer chains comprising Block α, Block β, and Block γ.

Depending on their miscibility, polymer chains in solution or suspension system can be self-assembled into domains of various structures. Without being bound to any theory, it is believed that a micelle-like structure may be formed by aggregating the tri-block copolymer chains comprising Block α, Block β, and Block γ. Blocks α and γ are typically directed toward the central region of the micelle and Blocks β are typically extended away from the center.

Without being bound to any theory, it is believed that a tri-block copolymer chain comprising Block α, Block β, and Block γ may exist in two conformations. With reference to FIG. 1, the first possible conformation may be called a "looped" conformation, in which the tri-block copolymer chain 001 is looped and Block α and Block γ are directed toward the central region 002 of a micelle and Block β is extended away from the central region 002. The second possible conformation may be called "extended" conformation, in which the tri-block copolymer chain 003is extended and Block α and Block γ are directed toward two central regions (004 and 005) of two micelles; and Block β may function as a bridge between the two central regions.

Without being bound to any theory, it is believed that a tri-block copolymer chain comprising Block α, Block β, and Block γ may be used to adjust the interactions between micelle-like structural domains. As such, the teachings of this disclosure can not only be used to selectively manipulate the interactions between formed micelles, but also take advantage of the self-assembly thermodynamics of copolymer chains in a selected solvent. For example, a tri-block copolymer chain may behave like a bridge between micelles, if Block β is sufficiently long. Thus, the formation of randomly linked tree-like micelles can be used for making nano-dendrites by adding a multiple-vinyl-substituted aromatic hydrocarbon such as divinyl benzene (DVB) to "freeze" the structure. Changing the size of the bridge can alter the physical forces between micelles. As a result, the change in physical forces can reconstruct the micelle structures, e.g., from two micelles to a cylinder, and then from several cylinders to a nano-sized chain or rope. If the bridge size is sufficiently small, the nano-assembly of polymer chains can change to spherical particles of flower-like inner structures.

In a variety of exemplary embodiments, di-block polymers may optionally be combined and/or polymerized with the tri-block copolymer chains comprising Block α, Block β, and Block γ, to effectively create assembling chains and build varieties of particle shapes. Such di-block copolymers may be comprised of a conjugated diene block and a vinyl aromatic hydrocarbon block. Suitable conjugated diene monomers and vinyl aromatic hydrocarbon monomers are those identified above. In certain embodiments, the di-block copolymers include styrene-isoprene, styrene-butadiene or styrene-SBR di-block polymers. Non-spherical polymeric nanoparticles may be constructed not only based on the self-assembly thermodynamics of tri-block and optionally di-block copolymers in selected solvents, but also based on the selective manipulation of interactions between formed micelles.

Any suitable multiple-vinyl-substituted aromatic hydrocarbon or mixture thereof may be used to copolymerize with Blocks α and Blocks γ of the tri-block copolymers, and optionally the vinyl aromatic hydrocarbon block of the di-block copolymer, in the micelle structures, and crosslink them to form polymeric nanoparticles. In certain embodiments, the multiple-vinyl-substituted aromatic hydrocarbon has a higher affinity with the vinyl aromatic hydrocarbon blocks of the tri-block and di-block copolymers. As such, the multiple-vinyl-substituted aromatic hydrocarbon is able to migrate to the center of the micelle-like structures, and crosslink the center core of the micelle to form the polymer nanoparticles. Consequently, the non-spherical polymeric nanoparticles are formed from the micelle-like structures with a core made from multiple-vinyl-substituted aromatic hydrocarbons, a shell made from the conjugated diene blocks, and a layer made from the vinyl aromatic hydrocarbon blocks, which lies between the core and the shell.

In certain embodiments, the tri-block copolymer chain(s) are in "extended" conformation, as illustrated in FIG. 1, and may function to connect two or more micelle-like structures. Therefore, Block β is called "bridge" in certain embodiments. Bridge size may be characterized by, for example, the value a in formula (I), molecular weight (Mw or Mn) of Block β, or length of Block β, among others.

The multiple-vinyl-substituted aromatic hydrocarbons can be represented by the formula below:

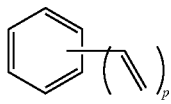

in which p is an integer and $2 \leq p \leq 6$, such as 2 or 3, e.g. di-vinyl-benzene (DVB).

In certain embodiments, the divinyl benzene may be selected from any one of the following isomers or any combination thereof:

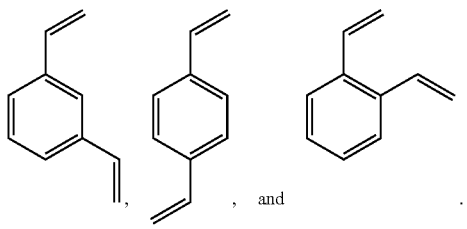

In copolymerizing multiple-vinyl-substituted aromatic hydrocarbons with the vinyl aromatic hydrocarbon blocks of the tri-block and optionally di-block copolymers in the micelle structures to form polymer nanoparticles, the copolymerization time for this step may last typically from 0.1 hours to 24 hours, such as from 0.1 hours to 10 hours, or from 0.4 hours to 8 hours.

The process of preparing the polymer nanoparticles may be conducted at a temperature of from −70° F. to 350° F., such as from 25° F. to 300° F., or from 100° F. to 200° F. In exemplified embodiments, a reactor was equipped with external jacket, which was heated to a temperature around 130° F.

The polymerization reactions used to prepare the polymer nanoparticles may be terminated with a terminating agent. Suitable terminating agents include, but are not limited to, alcohols such as methanol, ethanol, propanol, and isopropanol; amines, $MeSiCl_3$, $Me_2SiCl_2$, $Me_3SiCl$, $SnCl_4$, $MeSnCl_3$, $Me_2SnCl_2$, $Me_3SnCl$, and etc. In certain embodiments, the terminating agent may optionally contain an antioxidant such as butylated hydroxytoluene (BHT).

In the following five sections, specific conditions for the preparation of nanoparticles with controlled architectures of tree-like dendrite, nano-rope, nano-sphere with flower-like inner structure, nano-branch, and nano-disks will be described in detail.

(I) Tree-Like Dendrite

In certain embodiments, the controlled architecture of the polymer nanoparticle is in the shape of tree-like dendrite. The term "tree-like" dendrite is meant to encompass structures comprising a both longer and shorter "branches", similar to the structure of a tree. The mean diameter of the tree-like dendrite nanoparticle may be broadly within the range of from 5 nm to 100 microns, in another embodiment within the range of from 10 nm to 50 microns, and in a further embodiment within the range of from 100 nm to 5 microns In preparing the tree-like dendrite nanoparticles, the number average molecular weight ($Mn_\beta$) of Block β may be controlled within the range of from 19.5K to 35K, and in another embodiment within the range of from 22K to 30K, and in another embodiment within the range of from 24K to 27K. In certain embodiments, $Mn_\beta \approx 25K$.

In preparing the tree-like dendrites, the number average molecular weight ($Mn_\alpha$) of Block α is approximately equal to the number average molecular weight ($Mn_\gamma$) of Block γ, i.e. $Mn_\alpha \approx Mn_\gamma$. In certain embodiments, $Mn_\alpha$ or $Mn_\gamma$ may be controlled within the range of from 20K to 50K, in another embodiment within the range of from 25K to 45K, and in a further embodiment within the range of from 30K to 40K. In certain embodiments, $Mn_\alpha \approx Mn_\gamma \approx 35K$.

(II) Nano-Rope

In some embodiments, the controlled architecture of the polymer nanoparticle is in the shape of a nano-rope. The mean diameter of the nano-rope nanoparticle may be broadly within the range of from 1 nm to 200 nm, in another embodiment within the range of from 5 nm to 100 nm, in a further embodiment within the range of from 5 nm to 80 nm, and in yet another embodiment within the range of from 5 nm to 50 nm. The length of the nano-rope may be broadly within the range of from 0.1 μm to 200 μm, in another embodiment within the range of from 0.5 μm to 50 μm, and in another embodiment within the range of from 1 μm to 10 μm.

In preparing the nano-ropes, the number average molecular weight ($Mn_\beta$) of Block β may be controlled within the range of from 11.5K to 19.5K, in another embodiment within the range of from 13K to 16K, and in a further embodiment within the range of from 13.5K to 15K. In certain embodiments, $Mn_\beta \approx 14K$. In preparing the nano-ropes, the number average molecular weight ($Mn_\alpha$) of Block α is approximately equal to the number average molecular weight ($Mn_\gamma$) of Block γ, i.e. $Mn_\alpha \approx Mn_\gamma$. In a variety of exemplary embodiments, $Mn_\alpha$ or $Mn_\gamma$ may be controlled within the range of from 20K to 50K, alternatively within the range of from 25K to 45K, and in another embodiment within the range of from 30K to 40K. In certain embodiments, $Mn_\alpha \approx Mn_\gamma \approx 35K$.

(III) Nano-Spheres with Flower-Like Inner Structure

In some embodiments, the controlled architecture of the polymer nanoparticle is in the shape of nano-spheres with flower-like inner structure. The mean diameter of the spheres may be broadly within the range of from 1 nm to 500 nm, in another embodiment within the range of from 1 nm to 200 nm, in another embodiment within the range of from 1 nm to 100 nm, and in yet another embodiment within the range of from 5 nm to 80 nm.

In preparing the nano-spheres with flower-like inner structure the number average molecular weight ($Mn_\beta$) of Block β may be controlled within the range of from 5K to 11.5K, alternatively within the range of from 7K to 10K, and in another embodiment within the range of from 8K to 10K. In certain embodiments, $Mn_\beta \approx 9K$.

In preparing the nano-spheres with flower-like inner structure, the number average molecular weight ($Mn_\alpha$) of Block α is approximately equal to the number average molecular weight ($Mn_\gamma$) of Block γ, i.e. $Mn_\alpha \approx Mn_\gamma$. In certain embodiments, $Mn_\alpha$ or $Mn_\gamma$ may be controlled within the range of from 20K to 50K, in another embodiment within the range of from 25K to 45K, and in another embodiment within the range of from 30K to 40K. In certain embodiments, $Mn_\alpha \approx Mn_\gamma \approx 35K$.

(IV) Nano-Branch

In some embodiments, the controlled architecture of the polymer nanoparticle is in the shape of nano-branch. The mean diameter of the nano-branch may be broadly within the range of from 1 nm to 200 nm, in another embodiment within the range of from 5 nm to 100 μm, in a further embodiment within the range of from 5 nm to 80 micron, and in yet another embodiment within the range of from 5 nm to 50 micron.

In preparing the nano-branches, the number average molecular weight ($Mn_\beta$) of Block β may be controlled within the range of from 3K to 100K, in another embodiment within the range of from 3K to 50K, and in a further embodiment within the range of from 3K to 25K.

In preparing the nano-branches, the number average molecular weight ($Mn_\alpha$) of Block α is approximately equal to the number average molecular weight ($Mn_\gamma$) of Block γ, i.e. $Mn_\alpha \approx Mn_\gamma$. In a variety of exemplary embodiments, $Mn_\alpha$ or $Mn_\gamma$ may be controlled within the range of from 10K to 100K, in another embodiment within the range of from 20K to 50K and in another embodiment within the range of from 20K to 30K.

When copolymerizing multiple-vinyl-substituted aromatic hydrocarbons with the vinyl aromatic hydrocarbon blocks of the tri-block and optionally di-block copolymers in the micelle structures to form polymer nano-branches, the weight concentration of the copolymers in the liquid hydrocarbon medium ($M_1$) may be broadly within the range of from 5 to 40000, such as within the range of from 5 to 30000, or within the range of from 5 to 20000.

When di-block copolymers are prepared simultaneously with the tri-block copolymers, the ratio of di-functional initiator to mono-functional initiator can range from 100:0 to 1:100, in another embodiment from 100:0 to 1:10, and in a further embodiment from 100:0 to 1:3.

(V) Disk-Like Nanoparticles

In another embodiment, the architecture of nanoparticles is controlled to be in the shape of a disk. In addition to the disk-like shape, which features a relatively constant thickness in each discrete nanoparticle, the disk-like nanoparticle architecture differs significantly from the above tree-like dendrite, nano-rope, flower-like nanospheres, and nano-branch architectures in that the tri-block copolymer chains do not substantially bridge in the manner described above, e.g. less than 10%, such as less than 5%, or less than 1% of the tri-block copolymers bridge. In contrast, the tree-like dendrite, nano-rope, flower-like nanospheres, and nano-branch architectures are constructed by the bridging action of tri-block polymers between multiple micelle cores, which thereafter form a uniform elongated core.

Figure 11:
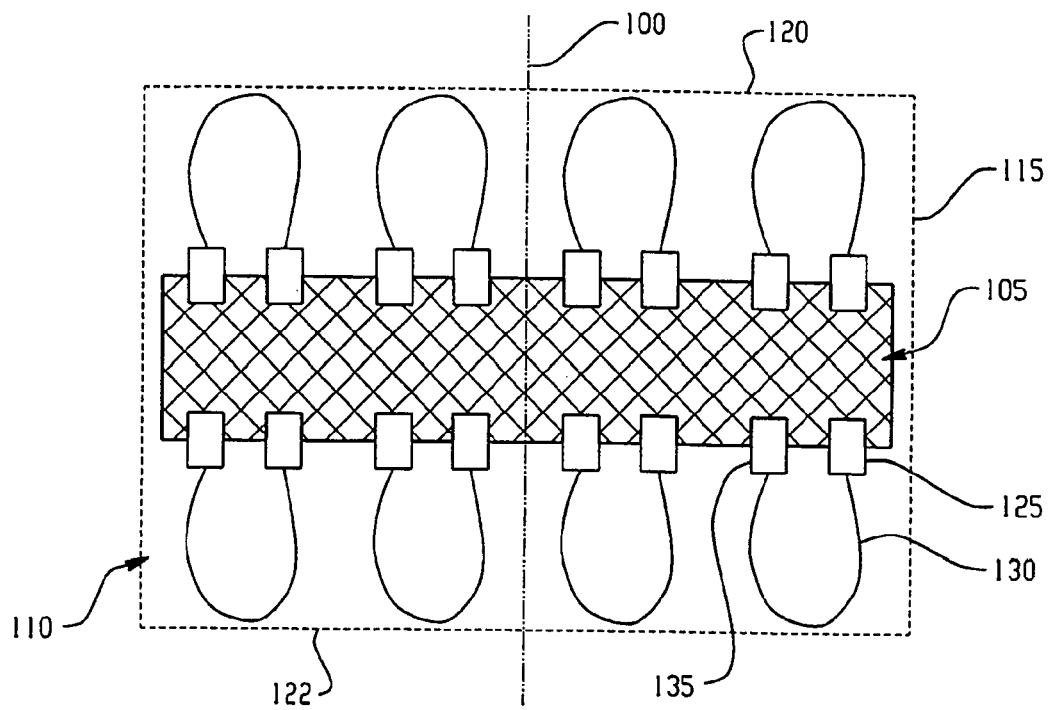
FIG. 11 is an illustration of a cross-sectional view of a disk-like nanoparticle comprising A-B-A tri-block copolymer chains.
Figure 12:
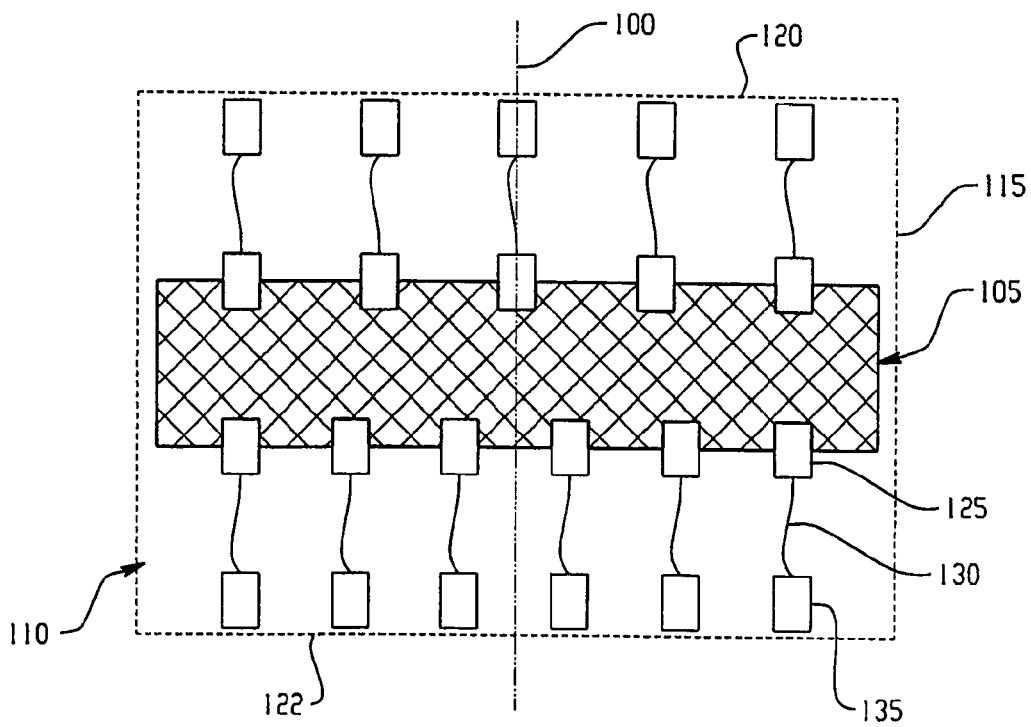
FIG. 12 is an illustration of a cross-sectional view of a disk-like nanoparticle comprising A-B-C tri-block copolymer chains.

A theoretical illustration of an example A-B-A disk-like nanoparticle is shown in FIG. 11 and a theoretical illustration of an example A-B-C disk-like nanoparticle is shown in FIG. 12. While not intending to be bound by theory, the illustrated structures are believed to be accurate representation of disk-like nanoparticles, based on the TEM photographs in FIGS. 13-17 and other information. An imaginary axis 100 is shown running through the center of the disk-like nanoparticle. This axis 100 is shown only for the purposes of illustration. Discrete lines are used to illustrate the general shape and configuration of the core 105, shell 110, radial surface 115, and axial surfaces 120, 122; however, these lines are not meant to imply that the disk-like nanoparticle is a perfect geometric cylinder with a perfectly spherical core.

The example disk-like nanoparticle has a core layer 105 that is centered about the axis 100. The core 105 comprises a cross-linked multi-vinyl substituted aromatic hydrocarbon. The core 105 also comprises the portion of the tri-block copolymer that is crosslinked with it.

The example disk-like nanoparticle also has a shell layer 110, which has a radial surface 115 at the outer radial edge and top and bottom axial surfaces 120, 122. The radial surface 115 and top and bottom axial surfaces 120, 122 are collectively outer surfaces. The shell layer 110 is comprised of substantially uncrosslinked tri-block copolymer chains, each having a first block 125, a second block 130, and a third block 135.

In FIG. 11, which depicts a disk-like nanoparticle with A-B-A tri-block copolymer chains, the first block 125 and third block 130 include vinyl aromatic monomer units and are crosslinked with the core 105. A middle portion of the second block 130 includes conjugated diene monomer units a portion of which comprises the top and bottom axial surfaces 120, 122 of the disk-like nanoparticle. As illustrated in FIG. 11, the tri-block copolymer chains are loop-like brushes or arms radiating out from the core layer, wherein the first block begins the first end of the loop and the second block begins the other end of the loop.

In FIG. 12, which depicts a disk-like nanoparticle with A-B-C tri-block copolymer chains, the first block 125 includes vinyl aromatic monomer units and is crosslinked with the core 105. The second block 130 radiates from the first block 125 and is bonded to the third block 135. The outer portion of the third block 135 comprises the top and bottom axial surfaces 120, 122 of the disk-like nanoparticle. The second block 130 includes conjugated diene monomer units, and the third block includes conjugated diene monomer units and/or vinyl aromatic monomer units and/or vinyl-acrylate monomer units, and/or vinyl, N, or O-substituted aromatic monomer units. As illustrated in FIG. 11, the tri-block copolymer chains are hairy brushes or arms radiating out from the core layer.

In both example illustrations, the shell layer 110 is substantially not cross-linked. Substantially not crosslinked meaning that no more than 20%, such as 0-10% or 0-3%, of the radiating tri-block polymer arms are crosslinked. This feature provides improved interactive qualities with polymeric matrices, such as rubber.

The disk-like nanoparticle forms via micelle assembly, as is described above. The second block radiates to the outside radial edge because it is more soluble in the selected hydrocarbon solvent than the first and third blocks.

The radial diameter of the disk-like nanoparticle ranges from 10-10,000 nm, such as 20-200 nm, or 25-90 nm and the axial thickness ranges from 2-100 nm, such as 5-50 nm or 10-25 nm. The thickness is relatively constant across the entire radius, and is less than the radial diameter. The difference in thickness from the thickest to the thinnest area of the disk-like nanoparticle may be from 0 to 20%, such as from 0 to 10%, or from 0 to 5%.

The core of the disk-like nanoparticle is harder than the shell. That is, the core has a higher Tg than the shell. For example, the core may have a Tg of 50 to 200° C., such as 70 to 150° C., or 80 to 125° C.; and the shell may have a Tg of less than 50° C. such as −150° C. to 40° C., or −125° C. to 0° C.

In attempting to make the disk-like architecture it was unexpectedly discovered that two factors primarily controlled the formation of the nano-disk shape: (1) the use of a multi-functional lithiated amine containing initiator, as described below, for polymerizing the tri-block copolymer; and (2) controlling the weight ratio of the monomer comprising the first block and third block of the tri-block copolymer chains to the monomer comprising the second block is to be 100:1 to 1:1, such as from 20:1 to 2:1, 10:1 to 4:1, 9:1 to 2.3:1, or 7:1 to 2:1.

Regarding the multi-functional lithiated amine-containing initiator that is used for polymerizing the tri-block polymer of the disk-like nanoparticles, the initiator comprises a multi-functional lithiated amine having at least two lithiated amines in one molecule of the initiator. For example, the initiator is a hydrocarbon solvent soluble, anionic polymerization multi-lithio amine initiators that comprises at least two or more lithio amines in one molecule and has the general formula:

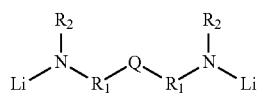

where Q is (a) an element selected from the group consisting of O, S, N, P and Si or (b) an alkylene group having from 1 to 20 methylene groups, (e.g., methylene groups, O or S) and $R_1$ and $R_2$ and are selected from the group consisting of alkyls, cycloalkyls and aralkyls containing from 1 to 20 carbon atoms (it being understood that alkyls, cycloalkyls and aralkyls are divalent in the context of $R_1$ and that the additional bond is created by the removal of a hydrogen from these moieties that are otherwise monovalent).

In one embodiment, 4,4'-trimethylenedipiperidine, a commercially available reagent from Aldrich was successfully metalated with n-BuLi (n-butyl lithium) and used for initiating the living polymerization of dienes and/or aromatic vinyls in hexane solution without any polar additives as shown in Scheme 1 below.

The advantages of this new difunctional initiator are: a) it is a mono-modal living system such that the polymer formed has a mono-modal molecular weight as characterized by gel permeation chromatography (GPC); b) an in-situ generation of the initiator; and c) the absence of polar additives. These advantages are especially useful for making head and tail di-functional polymers and SBS-tri-block copolymers with a low $T_g$ polybutadiene unit in the middle of the tri-block.

Scheme 1

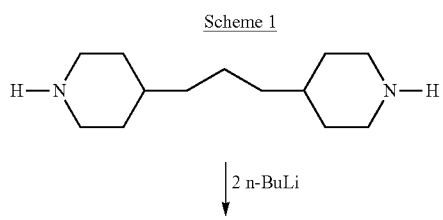

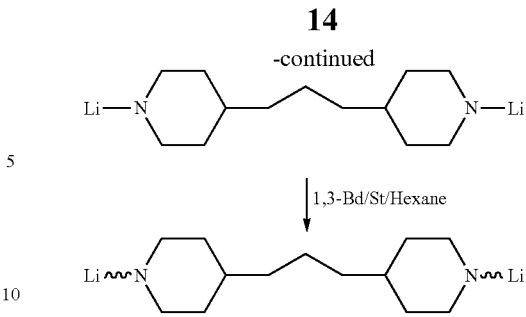

In another embodiment, a series of polyamines similar to 4,4'-trimethylenedipiperidine (TMDP) can be used as di- or tri-N—Li initiators for anionic polymerization of 1,3-butadiene and styrene. Examples of the di- and tri-lithio amine initiators include (scheme 2), but are not limited to, dilithio N,N'-diethyl-1,3-propanediamine (Li-DEPDA-Li), dilithio N,N'-diisopropyl-1,3-propanediamine (Li-DPPDA-Li), dilithio N,N'-diethyl-2-butene-1,4-diamine (Li-DEBDA-Li), trilithio tris[2-(methylamino)ethyl]amine (Tri-Li-TMAEA), trilithio tris[2-(isopropylamino)ethyl]amine (Tri-Li-TPAEA), and trilithio-1,5,9-triazacyclododecane (Tri-Li-TACD).

Scheme 2

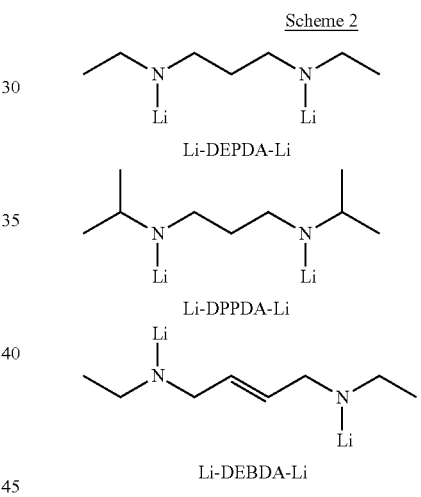

The amount of initiator employed in the disk-like nanoparticle synthesis can vary from 0.1 to 100 mmol of initiator per 100 g of monomer, such as from 0.33 to 10, or 0.2 to 1.0 mmol of lithium per 100 g of monomer.

The second factor that is believed to affect the formation of the disk-like shape in the nanoparticle is the weight ratio of the monomer comprising the first block and third block of the tri-block copolymer chains to the monomer comprising the second block. For example, the weight of monomer in the first and third blocks of the monomer units compared to the weight of the monomer units in the second block may be 100:1 to 1:1, such as from 50:1 to 1:1, 20:1 to 2:1, 10:1 to 4:1, 9:1 to 2.3:1, or 7:1 to 2:1.

In the example disk-like nanoparticles, the tri-block copolymer chains are either A-B-A copolymers, such as a vinyl aromatic hydrocarbon—conjugated diene—vinyl aromatic hydrocarbon copolymer, or A-B-C copolymers. However, in other examples, a mixture of A-B-A and A-B-C copolymers may be employed. Furthermore, monoblock polymer may also be synthesized separately, added prior to cross-linking and thereby bonded to the core. In addition diblock copolymers may be incorporated as described supra.

In preparing the disk-like nanoparticles, the number average molecular weight ($Mn_2$) of the second block may be controlled within the range of from 3K to 1000K, such as within the range of from 3K to 200K, or within the range of from 3K to 50K.

In example disk-like nanoparticles that have A-B-A tri-block copolymer chains in the shell, the number average molecular weight ($Mn_1$) of the first block is approximately equal to the number average molecular weight ($Mn_3$) of the third block, i.e. $Mn_1 \approx Mn_3$ (such as within 0-20% of being the same Mn, for example, 0-10%, or 0-5%).

When copolymerizing multiple-vinyl-substituted aromatic hydrocarbons with the vinyl aromatic hydrocarbon blocks of the tri-block copolymer chains, and optionally di-block copolymer chains in the micelle structures to form disk-like nanoparticles, the weight concentration of the copolymers in the liquid hydrocarbon medium ($M_1$) may be broadly within the range of from 0.01% to 20%, such as from 0.1% to 10%, or from 0.1% to 2%.

When di-block copolymers are prepared simultaneously with the tri-block copolymers, the ratio of di-functional initiator to mono-functional initiator can range from 100:0 to 1:100, such as 100:0 to 1:10, and in a further embodiment from 100:0 to 1:3. The same ratios can be used when mono-block polymer is added.

The disk-like nanoparticle is made by copolymerizing two or more monomer species with a multi-functional lithiated amine containing initiator, to form the second block to form tri-block copolymers, and then cross-linking to form a core. The multi-functional lithiated amine-containing initiator may be selected from the species described above.

To make the tri-block copolymers, the second block is polymerized first with the multi-functional lithiated initiator. The first and third blocks are then copolymerized with the second block to obtain the tri-block copolymer chains.

The first and third blocks comprise vinyl aromatic monomers. The vinyl aromatic monomer may be selected from the species disclosed above. Different monomer species may be selected if an A-B-C tri-block copolymer is desired. For example, the monomers for the third block may include conjugated diene monomer units and/or vinyl aromatic monomer units and/or vinyl-acrylate monomer units, and/or vinyl, N, or O-substituted aromatic monomer units.

The second block comprises a conjugated diene monomer. The conjugated diene monomer may be selected from the species disclosed above.

The polymerization is performed in a liquid hydrocarbon medium and micelle structures are formed therein. The second block should be selected to be more soluble in the hydrocarbon solvent than the first and third blocks, so that the second block will be on the outer surface of the micelle and the first and third blocks will be directed towards the center of the micelle. The hydrocarbon solvent may be selected from those disclosed above.

After copolymerization of the tri-block copolymers and assembly into micelle structures, in the case of A-B-A tri-block copolymer chains, multiple-vinyl-substituted aromatic hydrocarbons cross-link the first and third blocks of the tri-block copolymers in the micelle structures to form a cross-linked core. In the case of A-B-C tri-block copolymer chains only the first block may be crosslinked with the core. This cross-linked core stabilizes and holds the micelles together.

The multiple-vinyl-substituted monomer may be selected from the species disclosed above.

The disk-like nanoparticles can be included in rubber compositions as discussed below in detail. The shape of the disk-like nanoparticles is expected to provide an increase in viscosity and improved gas permeability in rubber compositions. This makes it an excellent potential additive for a tire rubber composition.

The non-spherical polymer nanoparticles may be widely utilized in the technical fields of rubbers, plastics, tire manufacture, medicine, catalysis, combinatorial chemistry, protein supports, magnets, photonics, electronics, cosmetics, and all other applications envisioned by the skilled artisan. For example, they can be used as processing aids and reinforcing fillers in rubber compounds.

In a variety of exemplary embodiments, rubber articles such as tires may be manufactured from a formulation comprising the polymer nanoparticles as described supra. References for this purpose may be made to, for example, U.S. Pat. No. 6,875,818.

In one embodiment, a rubber composition comprises (a) a rubber matrix; and (b) the non-spherical polymeric nanoparticles as described above. The typical amount of the polymeric nanoparticles in the rubber composition may broadly range from 1 phr to 150 phr, in another embodiment from 1 phr to 50 phr, in another embodiment from 1 phr to 20 phr, based on 100 parts per hundred parts rubber in the composition.

The terms "rubber" and "elastomer" if used herein, may be used interchangeably, unless otherwise prescribed. The terms such as "rubber composition", "compounded rubber" and "rubber compound", if used herein, are used interchangeably to refer to "rubber which has been blended or mixed with various ingredients and materials" and "rubber compounding" or "compounding" may be used to refer to the "mixing of such materials". Such terms are well known to those having skill in the rubber mixing or rubber compounding art.

The rubber matrix may comprise any solution polymerizable or emulsion polymerizable elastomer, for example, diene homopolymers, and copolymers and terpolymers of conjugated diene monomers with vinyl aromatic monomers and trienes such as myrcene. Exemplary diene homopolymers are those prepared from diolefin monomers having from 4 to 12 carbon atoms. Exemplary vinyl aromatic polymers are those prepared from monomers having from 8 to 20 carbon atoms. Examples of such monomers may be referred to the monomers for the nanoparticle formation as described supra. In one embodiment, the conjugated diene monomer and vinyl aromatic monomer are used at the weight ratios of from 1:99 to 99:1, in another embodiment the weight ratios are from 2:98 to 98:2. The copolymers are, for example, random copolymers which result from simultaneous copolymerization of the monomers with randomizing agents, as is known in the art.

The rubber matrix may comprise any conventionally employed treadstock rubber such as natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber, and the like, and the mixture thereof.

Rubber matrix used in tires, hoses, power transmission belts and other industrial products has good compatibility with fillers, such as carbon black and silica. To attain improved interaction with fillers, the rubber matrix can be functionalized with various compounds, such as amines.

In one embodiment, carbon black can be used as a reinforcing filler in the rubber compounds of the present invention. The carbon black may be selected from any of the commonly available carbon blacks, but those having a surface area (EMSA) of at least 20 m$^2$/g, such as at least 35 m$^2$/g, or up to 200 m$^2$/g or higher. Surface area values may be determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks may also be used. Exemplary carbon blacks include N-110, N-220, N-339, N-330, N-343, N-351, N-550, N-660, and the like, as designated by ASTM D-1765-82a. The carbon blacks utilized may be in pelletized form or an unpelletized flocculent mass. For more uniform mixing, unpelletized carbon black is used.

In certain embodiments, the amount of carbon black may broadly range from 10 phr to 150 phr, from 20 phr to 120 phr, and from 30 phr to 100 phr.

Silica may also be used as a filler in the rubber compounds described herein. Exemplary silica fillers include, but are not limited to, precipitated amorphous silica, wet silica (hydrated silicic acid), dry silica (anhydrous silicic acid), fumed silica, and precipitated amorphous wet-process, hydrated silicas. In one embodiment, the surface area of the silica filler is from 32 m$^2$/g to 400 m$^2$/g, in another embodiment the surface area is from 100 m$^2$/g to 250 m$^2$/g, and in another embodiment the surface area is from 150 m$^2$/g to 220 m$^2$/g. The pH of the silica filler is generally within the range of 5.5 to 7, and in another embodiment within the range of 5.5 to 6.8.

The silica filler may be selected from any of the commonly available silicas. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J.M. Huber Corporation.

To improve filler dispersion and reduce agglomeration and re-agglomeration of silica aggregates, a coupling agent may be used along with silica fillers. Typically, a silica coupling agent has at least two functional groups, one of which is reactive with the silica surface such as a silyl group, and another one can bind to the rubbery matrix such as mercapto, amino, vinyl, epoxy or sulfur group. Exemplary coupling agents include, but are not limited to, mercaptosilanes and organosilane polysulfides.

A silica dispersing aid such as monofunctional silica shielding agent may be used along with silica fillers. Examples of silica dispersing aids include silica hydrophobating agents that chemically react with the surface silanol groups on the silica particles but are not reactive with the matrix elastomer, and agents which physically shield the silanol groups to prevent reagglomeration (flocculation) of the silica particles after compounding. Specific examples of silica dispersing aid include alkyl alkoxysilanes, glycols (e.g., diethylene glycol or polyethylene glycol), fatty acid esters of hydrogenated and non-hydrogenated $C_5$ and $C_6$ sugars (e.g., sorbitan oleates, and the like), polyoxyethylene derivatives of the fatty acid esters, among others.

If used, silica may be present in the rubber compounds in an amount of from 10 phr to 150 phr, in another embodiment from 20 phr to 120 phr, and in a further embodiment from 30 phr to 100 phr.

In certain embodiments, a combination of silica and carbon black are utilized as reinforcing fillers in rubber compounds intended for use in various rubber products, including treads for tires.

Other fillers can also be utilized as processing aids which include, but are not limited to, mineral fillers, such as aluminum silicate, calcium silicate, magnesium silicate, clay (hydrous aluminum silicate), talc (hydrous magnesium silicate), and mica as well as non-mineral fillers such as urea and sodium sulfate.

Oil can be included in the rubber compounds as a processing aid. Examples of suitable oils include aromatic, naphthenic, paraffinic processing oils, as well as combinations of the same. In one embodiment, the amount of oil may range from 0 phr to 150 phr, in another embodiment from 10 phr to 120 phr, and in yet another embodiment from 15 phr to 70 phr.

A vulcanizing agent is used to cure the rubber compounds described herein. For a general disclosure of suitable vulcanizing agents, one can refer to Kirk-Othmer, *Encyclopedia of Chemical Technology*, 3$^{rd}$ ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination. In some embodiments, sulfur or peroxide-based vulcanizing agent may be employed. Examples of suitable sulfur vulcanizing agents include "rubber maker's" soluble sulfur; elemental sulfur (free sulfur); sulfur donating vulcanizing agents such as organosilane polysulfides, amine disulfides, polymeric polysulfides or sulfur olefin adducts; and insoluble polymeric sulfur. In one embodiment, the sulfur vulcanizing agent is soluble sulfur or a mixture of soluble and insoluble polymeric sulfur.

The amount of vulcanizing agent, may range from 0.1 phr to 10 phr, in another embodiment from 1 phr to 5 phr, and in another embodiment from 1 phr to 3 phr.

A vulcanization accelerator may be used along with a vulcanizing agent. The vulcanization accelerators are not particularly limited. Examples of vulcanization accelerators include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; guanidine vulcanization accelerators, such as diphenylguanidine (DPG) and the like; amines; disulfides; thiurams; sulfenamides; dithiocarbamates; xanthates; and thioureas; among others.

The amount of vulcanization accelerator, if used, may range from 0.1 phr to 10 phr, in another embodiment from 0.1 phr to 5 phr, and in another embodiment 0.1 phr to 3 phr.

The composition may be compounded by methods generally known in the rubber compounding art, such as mixing the rubbery matrix polymer and the non-spherical nanoparticles with conventional amounts of commonly used additive materials such as, in addition to those identified above, for example, activators, retarders, other processing additives such as resins, and including tackifying resins, plasticizers, pigments, fatty acids, zinc oxide, waxes, antioxidants, antiozonants, and peptizing agents, using standard rubber mixing equipment and procedures.

A vulcanized rubber product may be produced by thermomechanically mixing rubbery matrix polymer, the nanoparticles, and various ingredients in a sequentially step-wise manner in a mixer, followed by shaping and curing the composition.

The composition described herein can be used for various purposes. For example, it can be used for various rubber compounds, such as a tire treadstock, sidewall stock or other tire component stock compounds. Such tires can be built, shaped, molded and cured by various methods which are known and will be readily apparent to those having skill in such art. In one embodiment, a molded unvulcanized tire is placed into a vulcanizing mold and then vulcanized to produce a tire.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

In Examples 1-3, a 2-gallon reactor equipped with external heating jacket and internal agitation was used for all materials preparation. Styrene in hexane (33 weight percent styrene), hexane, butyllithium (1.54 M) and BHT were used as supplied. Isoprene (100% pure) was stored on aluminum oxide beads and calcium hydride under nitrogen. Technical grade divinyl benzene (80%, mixture of isomers, purchased from Aldrich, item 41,456-5) was stored on aluminum oxide beads and calcium hydride under nitrogen.

The di-lithium solution (~0.5M) was made according to the following procedure. To a clean, dry, $N_2$ purged closed bottle is charged equimolar amounts of triethyl amine and butyllithium. Then 1,3-diisopropenyl benzene is added at a target molar ratio of 1.2 to the sec-butyllithium. The bottle is then heated with agitation for 2.0 hours at 50° C.

For the following examples, sec-BuLi (57.14 ml, 1.4 M in cyclohexane, purchased from Aldrich) was added to a solution of 1,3-diisopropenylbenzene (6.84 ml, 40 mmol) and triethylamine (11.15 ml, 80 mmol) via a syringe at room temperature. The solution was agitated and heated at 50° C. for 2 hours. The deep red Li diadduct (abbreviated as DiLi, 0.53 M) was used as the di-lithium initiator and stored in freezer until use.

Example 1

The reactor was charged with 4 lbs. hexane and 0.373 lbs. isoprene (IP). The jacket of the reactor was heated to 135° F. When the batch reached 135° F., 15 ml of 0.5 M di-lithium solution was added. After 2 hours, 1.5 lb. styrene/hexane blend (containing 33 wt % styrene) was added to the reactor which was maintained at 135° F. An exothermic peak was observed after 20 minutes. After 2 hours, 50 ml divinylbenzene (DVB) was charged into the solution. The solution was allowed to react for an additional 2 hours, and then the reaction mixture was dropped into an isopropanol/acetone solution containing BHT (about 500 mL/2 L). The solid was then filtered through a cheese-cloth and dried in vacuum. The product could be dissolved in a number of solvents, such as THF, toluene, and hexane. Those solutions were usually thick and gel-like, indicating that the synthesized polymer might have supra-architectures.

GPC analysis of the intermediate product, based on a polystyrene/THF standard, indicates block copolymer having a number average molecular weight (Mn) of 121K and a polydispersity (Mw/Mn) of 1.17. The block copolymer was designed as a tri-block, in which the polystyrene block had a target Mn of 35K and the isoprene blocks had a target Mn of 25K. The TEM analysis was taken on a hexane solution of the final product at $10^{-5}$ wt % concentration. A drop of the diluted solution was coated on a carbon coated copper micro-grid. After the solvent was vaporized, the grid was stained with $RuO_4$ and was then examined by TEM (see FIG. 1). It was found that the product synthesized contained tree-like dendrites composed of linked nano-spherical particles.

Example 2

In Example 2, the size of the isoprene block of the tri-block polymers was decreased from a target Mn of 25K to 14K. The reactor was charged with 4 lbs. hexane and 0.229 lbs. isoprene. The jacket of the reactor was heated to 135° F. When the batch reached 135° F., 15 ml of 0.5 M di-lithium solution was added. After 2 hours, 1.5 lbs. styrene/Hexane blend (containing 33 wt % styrene) was added to the reactor which was maintained at 135° F. An exothermic peak was observed after 20 minutes. After 1.5 hours, the color of the solution was yellow. 50 ml divnyl benzene (DVB) was then charged into the solution. After about 7 minutes, the agitation was stopped. The solution was allowed to react for an additional 1.5 hours; the reaction mixture was then dropped into an isopropanol/acetone solution containing BHT (about 500 mL/2 L). The solid was then filtered through a cheese-cloth and dried in vacuum.

Figure 2:
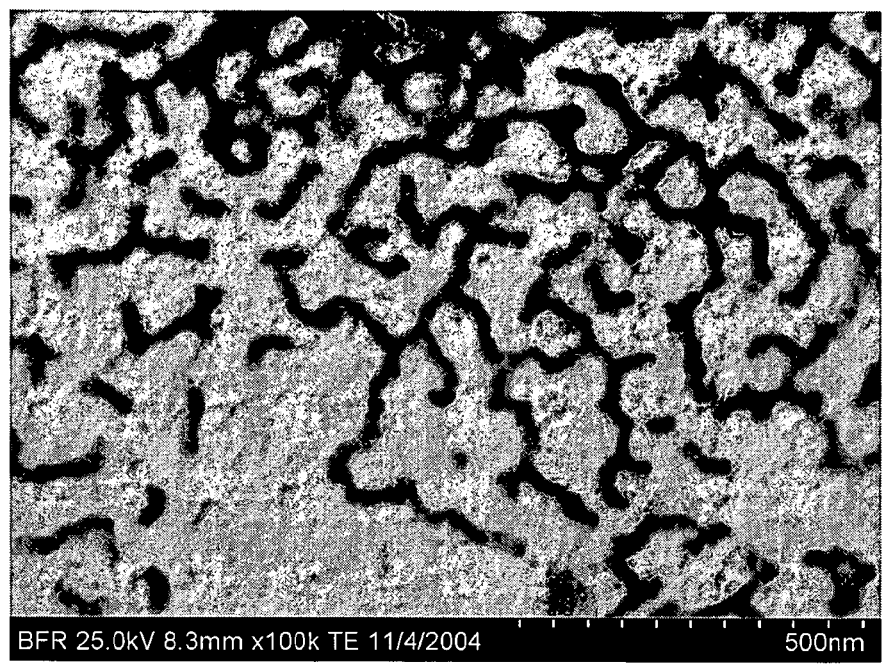
FIG. 2 is a transmission electron microscopy (TEM) photograph of polymer nanoparticles with controlled architecture of a tree-like dendrite.

GPC analysis of the intermediate product, based on a polystyrene/THF standard, indicated block copolymer having a number average molecular weight (Mn) of 79, and a polydispersity (Mw/Mn) of 1.2. A TEM analysis of a hexane solution of the final product at $10^{-5}$ wt % concentration was conducted. A drop of the diluted solution was coated on a carbon coated copper micro-grid. After the solvent was vaporized, the grid was stained with $RuO_4$, and was then examined by TEM (see FIG. 2). The results showed that the product synthesized contained nano-rope structures.

Example 3

In Example 3, the size of the isoprene block of the tri-block polymers was further decreased from a target Mn of 14K to 9K, and the nano-assembly of polymer chains changed to spherical particles with flower-like inner structures. The reactor was charged with 2 lbs. hexane and 0.195 lbs. isoprene. The jacket of the reactor was heated to 135° F. When the batch reached 135° F., 15 ml of 0.5 M di-lithium solution were added. After 2 hours, 1.5 lb. styrene/Hexane blend (containing 33 wt % styrene) were added to the reactor which was maintained at 135° F. An exothermic peak was observed after 20 minutes. After 2 hours, the color of solution was orange. 50 ml divnyl benzene (DVB) was then charged into the solution. The solution was allowed to react for an additional 2.5 hours. The reaction mixture was then dropped in an isopropanol/acetone solution containing BHT (about 500 mL/2 L). The solid was then filtered through cheesecloth and dried in vacuum.

Figure 3:
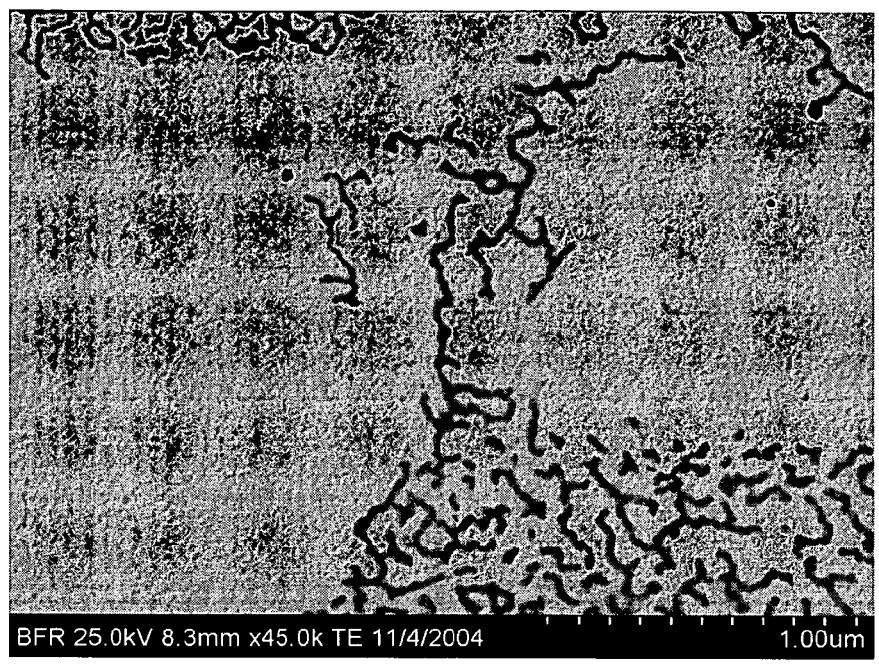
FIG. 3 is a TEM photograph of polymer nanoparticles with controlled architecture of a nano-rope.
Figure 4:
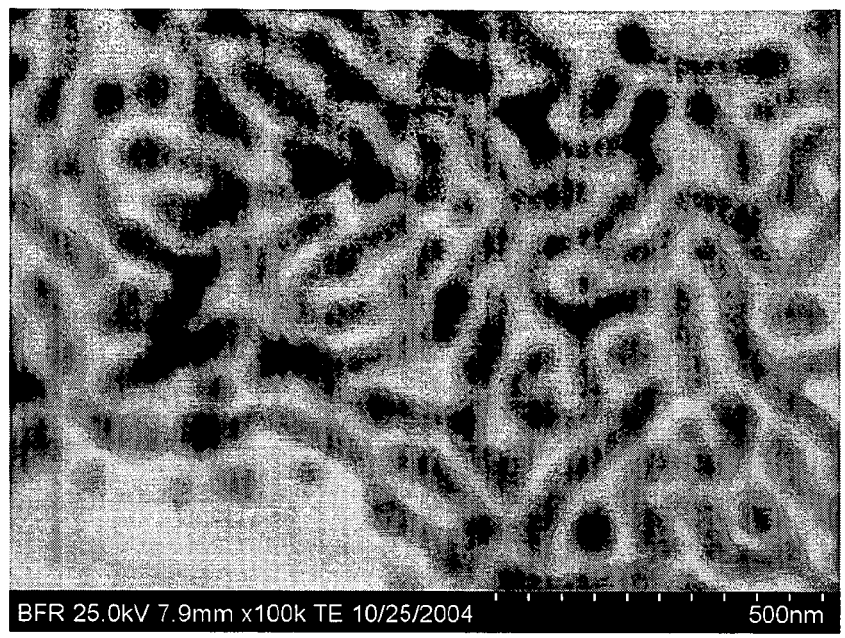
FIG. 4 is a TEM photograph of polymer nanoparticles with controlled architecture of a nano-sphere with flower-like inner structure.

GPC analysis of the intermediate product, based on a polystyrene/THF standard, indicated block copolymer having a number average molecular weight (Mn) of 58K and a polydispersity (MW/Mn) of 1.03. The TEM analysis was taken on a hexane solution of the final product at $10^{-5}$ wt % concentration. A drop of the diluted solution was coated on a carbon coated copper micro-grid. After the solvent was vaporized, the grid was stained with $RuO_4$ and was then examined by TEM (see FIG. 3). The results showed that the product synthesized contained spherical particles with flower-like inner structures.

In Examples 4-7, a 2-gallon reactor equipped with external jacked heating and internal agitation was used for all material preparation. Styrene in hexane (33 weight percent styrene), hexane, butyllithium (BuLi, 1.6 M) and BHT were used as supplied. Isoprene (100% pure) was stored on aluminum oxide beads and calcium hydride under nitrogen. Technical grade divinylbenzene (80%, mixture of isomers, purchased from Aldrich, item 41,456-5) was stored on aluminum oxide beads and calcium hydride under nitrogen. The di-lithium solution (~0.5M) was made according to the method described above.

Example 4

The reactor was charged with 4 lbs. hexane and 0.231 lbs. isoprene. The jacket of the reactor was heated to 135° F. When the batch reached 135° F., 7.5 ml of 0.5 M di-lithium solution and 2.4 ml of 1.6 M BuLi were added. After 2 hours, 1.5 lbs. styrene/hexane blend (containing 33 wt % styrene) was added to the reactor that was maintained at 135° F. An exothermic peak was observed after 20 minutes. After 1.5 hours, 50 ml divinyl benzene (DVB) was charged into the solution. The solution was allowed to react for an additional 1.5 hours, and then the reaction mixture was dropped in an isopropanol/acetone solution containing BHT (about 500 mL/2 L). The solid was then filtered through a cheese cloth and dried in vacuum.

Figure 5:
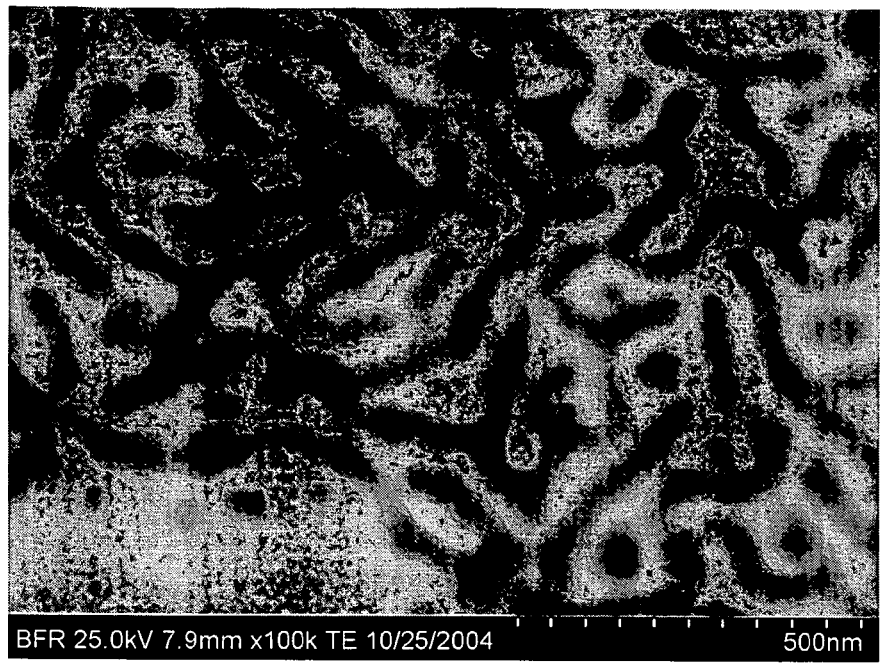
FIG. 5 is a TEM photograph of polymer nanoparticles with architecture of sphere, chain, dumbbell and other irregular structures.

A drop of the diluted solution was coated on a carbon coated copper micro-grid. After the solvent was vaporized, the grid was stained with $RuO_4$ and was then examined by TEM. As shown in FIG. 5, the product synthesized contained spheres, chains, dumbbells and other highly organized structures.

Example 5

In Example 5, the size of the isoprene block of the tri-block polymers was increased over that of Example 4. The reactor was initially charged with 4 lbs. hexane and 0.31 lbs. isoprene. The synthesis process and the charge of other components was the same as that described in Example 4.

Figure 6:
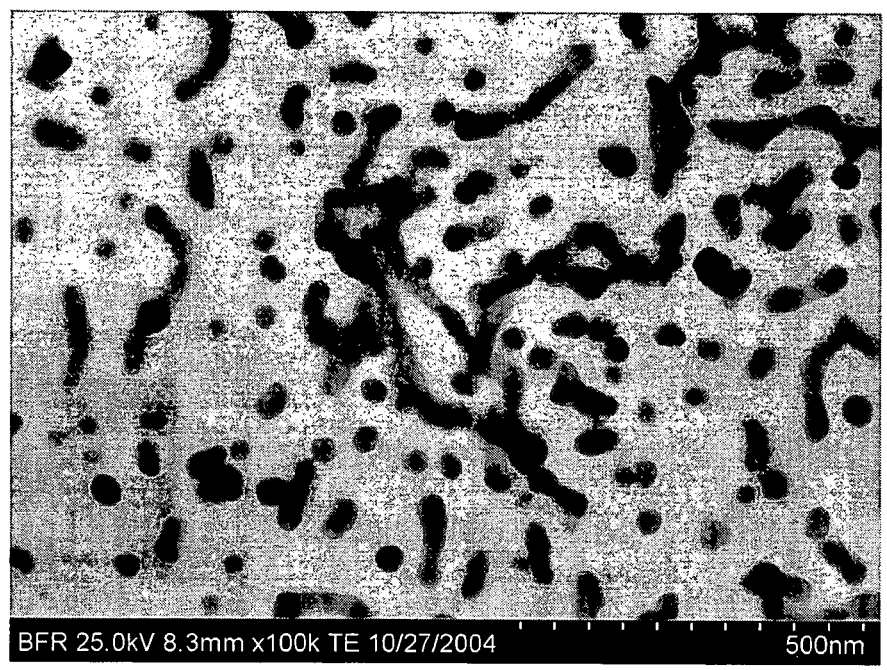
FIG. 6 is a TEM photograph of polymer nanoparticles with architecture of short nano-ropes.

A TEM analysis was performed on a hexane solution of the final product at $10^{-5}$ wt % concentration. A drop of the diluted solution was coated on a carbon coated copper micro-grid. After the solvent was vaporized, the grid was stained with $RuO_4$ and was then examined by TEM. As shown in FIG. 6, the product synthesized contained short nano-ropes.

Example 6

In Example 6, the size of the isoprene block of the tri-block polymer was reduced, resulting in the formation of nano branches. The reactor was charged with 4 lbs. hexane and 0.185 lbs. isoprene. The jacket of the reactor was heated to 135° F. When the batch reached 135° F., 7.5 ml of 0.5 M dilithium solution and 2.4 ml of 1.6 M BuLi were added. After 2 hours, 1.5 lbs. styrene/Hexane blend (containing 33 wt % styrene) was added to the reactor that was maintained at 135° F. An exothermic peak was observed after 20 minutes. After 1.5 hours, the color of solution was orange. 50 ml divinylbenzene (DVB) was then charged into the solution. The solution was allowed to react for an additional 1.5 hours; and the reaction mixture was then dropped in an isopropanol/acetone solution containing BHT (about 500 mL/2 L). The solid was then filtered through a cheese cloth and dried in vacuum.

Figure 7:
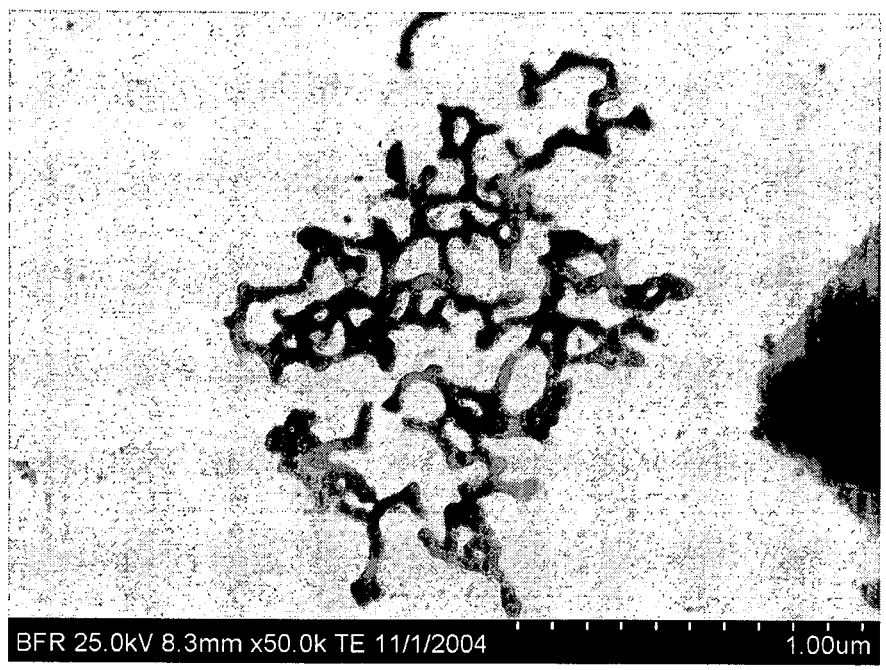
FIG. 7 is a TEM photograph of polymer nanoparticles with architecture of short nano-sized branches.
Figure 8:
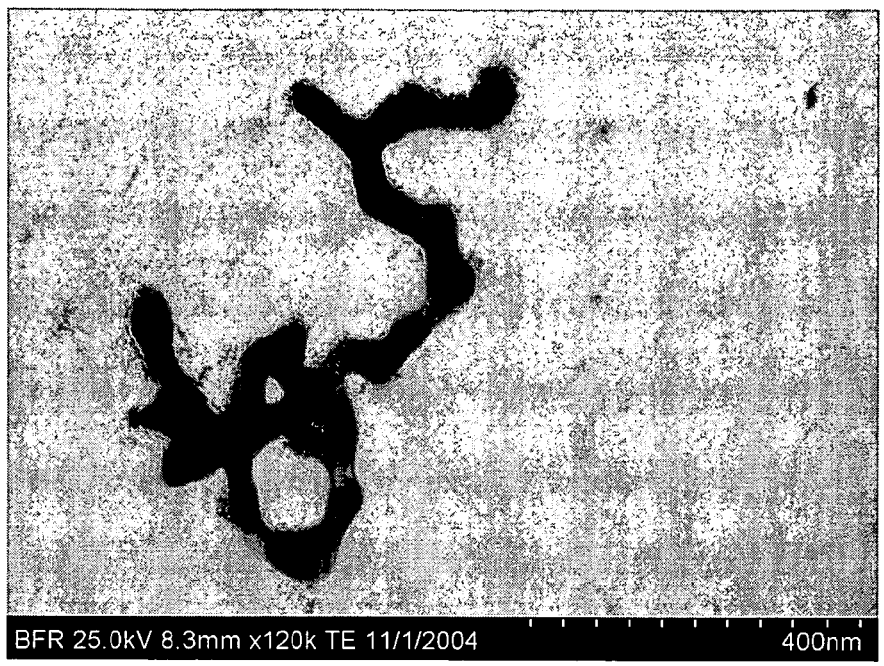
FIG. 8 is a TEM photograph of polymer nanoparticles with architecture of a short nano-sized branch.

A TEM analysis was conducted on a hexane solution of the final product at $10^{-5}$ wt % concentration. A drop of the diluted solution was coated on a carbon coated copper micro-grid. After the solvent was vaporized, the grid was stained with $RuO_4$ and was then examined by TEM. As shown in FIG. 7, the product contained short nano-sized branches. One of the branches looked somewhat rigid (see FIG. 8) and appeared to stretch out in three dimensions.

Example 7

By adjusting types and amounts of materials added to the reactor, a product with an architecture of narrowly distributed nano-branches was formed. The reactor was charged with 4 lbs. hexane and 1.15 lbs. Butadiene/Hexane solution (21.4% Butadiene). The jacket of the reactor was heated to 135° F. When the batch reached 135° F., 10 ml of 0.5 M dilithium solution and 1 ml of 1.6 M BuLi were added. After 2 hours, 1.5 lbs. styrene/Hexane blend (containing 33 wt % styrene) were added to the reactor that was maintained at 135° F. An exothermic peak was observed after 20 minutes. After 1.5 hours, 50 ml divinyl-benzene (DVB) was then charged into the solution. The solution was allowed to react for an additional 1.5 hours; and the reaction mixture was then dropped in an isopropanol/acetone solution containing BHT (about 500 mL/2 L). The solid was then filtered through a cheese cloth and dried in vacuum.

Figure 9:
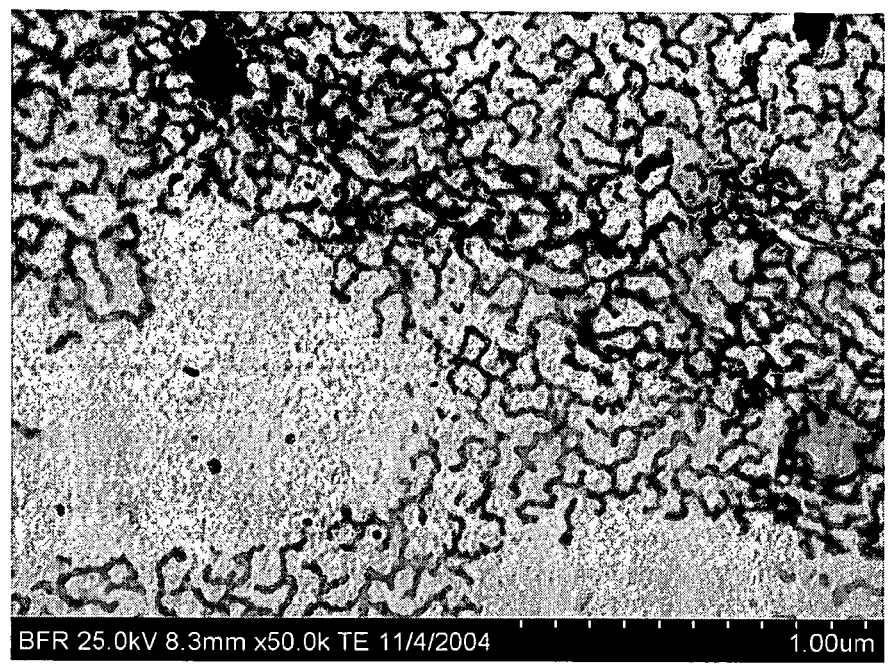
FIG. 9 is a TEM photograph of polymer nanoparticles with architecture of narrowly distributed nano-sized branches.
Figure 10:
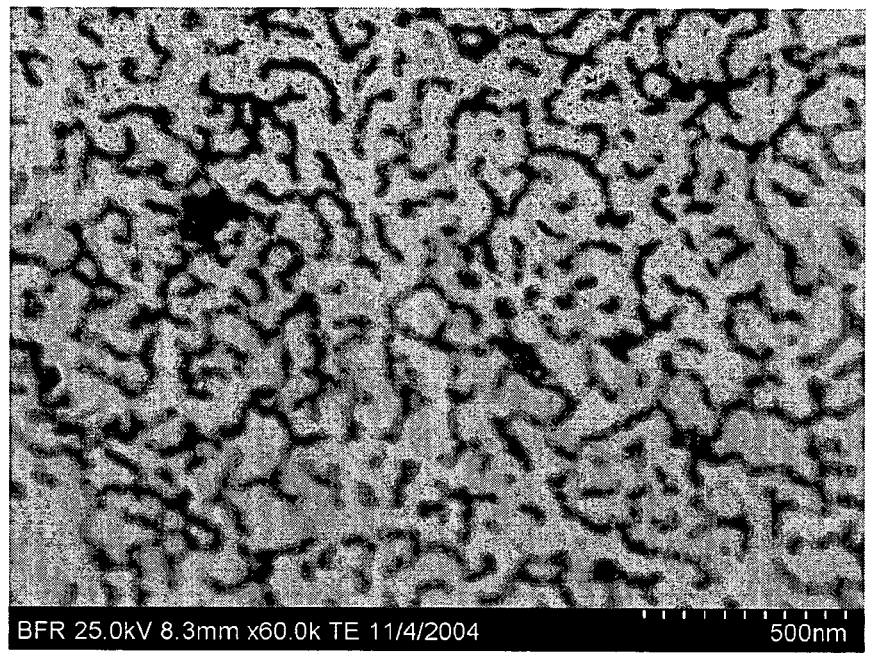
FIG. 10 is a TEM photograph of polymer nanoparticles with architecture of narrowly distributed nano-sized branches.

A TEM analysis was conducted on a hexane solution of the final product at $10^{-5}$ wt % concentration. A drop of the diluted solution was coated on a carbon coated copper micro-grid. After the solvent was vaporized, the grid was stained with $RuO_4$ and was then examined by TEM. As shown in FIGS. 9 and 10, the product contained narrowly distributed nano-sized branches.

Examples 8, 9 and 10

Application of the Nano-Branches in a Rubber Formulation

Three rubber compositions were prepared according to the formulation shown in Tables 1 and 2 by selectively using the nanoparticles of Examples 6 and 7 to replace 10 phr of SBR in the compound formulation (i.e., Examples 9 and 10).

In each sample, the ingredients were mixed according to the method of Table 3. The final stocks were sheeted and cured at 165° C. for 15 minutes.

TABLE 1

Composition for Master Batch (in phr)

| | Ex. 8 | Ex. 9 | Ex. 10 |
|---|---|---|---|
| SBR | 100.00 | 90.00 | 90.00 |
| Example 6 (nanoparticle) | 0 | 10.00 | 0 |
| Example 7 (nanoparticle) | 0 | 0 | 10.00 |
| Carbon Black (N343) | 50.00 | 50.00 | 50.00 |
| Aromatic Oil | 15.00 | 15.00 | 15.00 |
| Zinc Oxide | 3.00 | 3.00 | 3.00 |
| Hydrocarbon Resin (tackifiers) | 2.00 | 3.00 | 3.00 |
| Antioxidant | 0.95 | 0.95 | 0.95 |
| Stearic Acid | 2.00 | 2.00 | 2.00 |
| Wax | 1.00 | 1.00 | 1.00 |

TABLE 2

| Composition for Final Batch (in phr) | | | |
|---|---|---|---|
| Sulphur | ~1.30 | ~1.30 | ~1.30 |
| Cyclohexyl-benzothiazole Sulfonamide (accelerator) | 1.40 | 1.40 | 1.40 |
| Diphenylguanidine (accelerator) | 0.20 | 0.20 | 0.20 |

TABLE 3

Mixing Conditions.
Mixer: 300 g Brabender    Agitation Speed: 60 rpm

| Mater Batch Stage Initial Temperature 110° C. | |
|---|---|
| 0 min | charging polymers |
| 0.5 min | charging oil and Carbon Black |
| 5.0 min | drop |

| Final Batch Stage Initial Temperature 75° C. | |
|---|---|
| 0 sec | charging master stock |
| 30 sec | charging curing agent and accelerators |
| 75 sec | drop |

The analysis of the vulcanized rubber compounds of Examples 8-10, included tensile strength, tear strength, hysteresis loss gave the results, as shown in Table 4. Measurement of tensile strength was based on conditions of ASTM-D 412 at 22° C. Test specimen geometry was taken the form of a ring of a width of 0.05 inches and of a thickness of 0.075 inches. The specimen was tested at a specific gauge length of 1.0 inch. The measurement of tear strength was based on conditions of ASTM-D 624 at 170° C. Test specimen geometry was taken the form of a nicked ring (ASTM-624-C). The specimen was tested at the specific gauge length of 1.750 inches. The hysteresis loss was measured with a Dynastat Viscoelastic Analyzer. Test specimen geometry was taken the form of a cylinder of a length of 15 mm and of a diameter of 10 mm. The following testing conditions were employed: frequency 1 Hz, 2 kg static load and 1.25 kg dynamic load.

TABLE 4

| | Ex. 8 | Ex. 9 | Ex. 10 |
|---|---|---|---|
| 130° C. ML4 | 36.38 | 39 | 41.8 |
| MDR 2000 165° C. MH | 13.17 | 13.22 | 13.61 |
| T90 | 5.6 | 5.94 | 5.76 |
| Shore A 22c (3 sec) | 55.4 | 64.3 | 62.2 |
| 100° C. (3 sec) | 53.5 | 57.4 | 56.4 |
| Ring Tensile at 23° C. | | | |
| Tb(MPa) | 16.73 | 16.44 | 18.85 |
| Eb (%) | 548.4 | 502.9 | 523.2 |
| M300 | 7.07 | 8.6 | 9.25 |
| M50 | 0.93 | 1.25 | 1.25 |
| Ring Tensile at 100° C. | | | |
| Tb (MPa) | 8.36 | 8.5 | 8.54 |
| Eb (%) | 377.8 | 366.6 | 352 |
| M300 | 5.94 | 6.42 | 6.81 |
| M50 | 0.69 | 0.8 | 0.78 |
| Tear Strength (kN/m) | 16.7 | 17.1 | 18.0 |
| Ring Tear travel (%) 170° C. | 410 | 410 | 395 |
| Tg of Compound (from tan delta) | −42 | −42 | −42 |
| Stanley London (concrete) | 56.2 | 57 | 52.6 |
| Dynstat tan delta at 50° C. | 0.1906 | 0.2351 | 0.2195 |
| K' (lbf/in) | 141.14 | 241.16 | 203.38 |
| Tan delta 25° C. | 0.2311 | 0.2600 | 0.2539 |
| K' (lbf/in) | 178.13 | 385.19 | 277.32 |
| Tan delta 0° C. | 0.2571 | 0.2528 | 0.2567 |

TABLE 4-continued

| | Ex. 8 | Ex. 9 | Ex. 10 |
|---|---|---|---|
| K' (lbf/in) | 259.02 | 639.71 | 494.91 |
| Tan delta −20° C. | 0.2967 | 0.2838 | 0.3269 |
| K' (lbf/in) | 374.23 | 890.85 | 689.54 |

Examples 11-13

Disk-Like Nanoparticles

Dilithium Initiator Preparation

Two methods were used to synthesize the dilithium initiator. In method 1, 4,4'-trimethylenedipiperidine, from Aldrich, was first metalated with a mole equivalent amount of n-butyl lithium. The resultant material was then used to initiate the polymerization of dienes.

In method 2, 4,4'-trimethylenedipiperidine, from Aldrich, was first charged into a diene monomer solution. This solution was then charged with a mole equivalent amount of n-butyl lithium.

Method 2 was relatively better in industrial production in terms of feasibility and reliability. Although the resultant material easily phases out from hydrocarbon solution, after initializing the butadiene polymerization, it stays in solution.

Synthesis of Disk-Like Nanoparticles

Example 11

To a two-gallon, $N_2$-purged reactor equipped with a stirrer was added 4.99 lb hexane, and 0.92 lb butadiene/hexane blend (containing 21.7 wt % of butadiene). The reactor was then set to 135° F. After the temperature was stabilized, 4 ml (1 M) of 4,4'-trimethylenedipiperidine in toluene and 5.4 ml (1.6 M) of butyllithium in hexane were charged to the reactor. After three hours, 2.7 ml of OOPs (1.6 M) in hexane was charged to the reactor. Following that immediately, the reactor was charged with 2.42 lb styrene/Hexane blend (containing 33 wt % styrene). The reaction was continued for another 3 hrs. Then the reactor was charged with 50 ml of divinyl benzene. After 2.5 more hours, the reaction was stopped by dropping the product into isopropenol and then treated with ~1% Irganox 1520L antioxidant (AO) (4,6-bis(octylthiomethyl)-o-cresol). The product composed 20 wt % butadiene and 80 wt % styrene.

Figure 13:
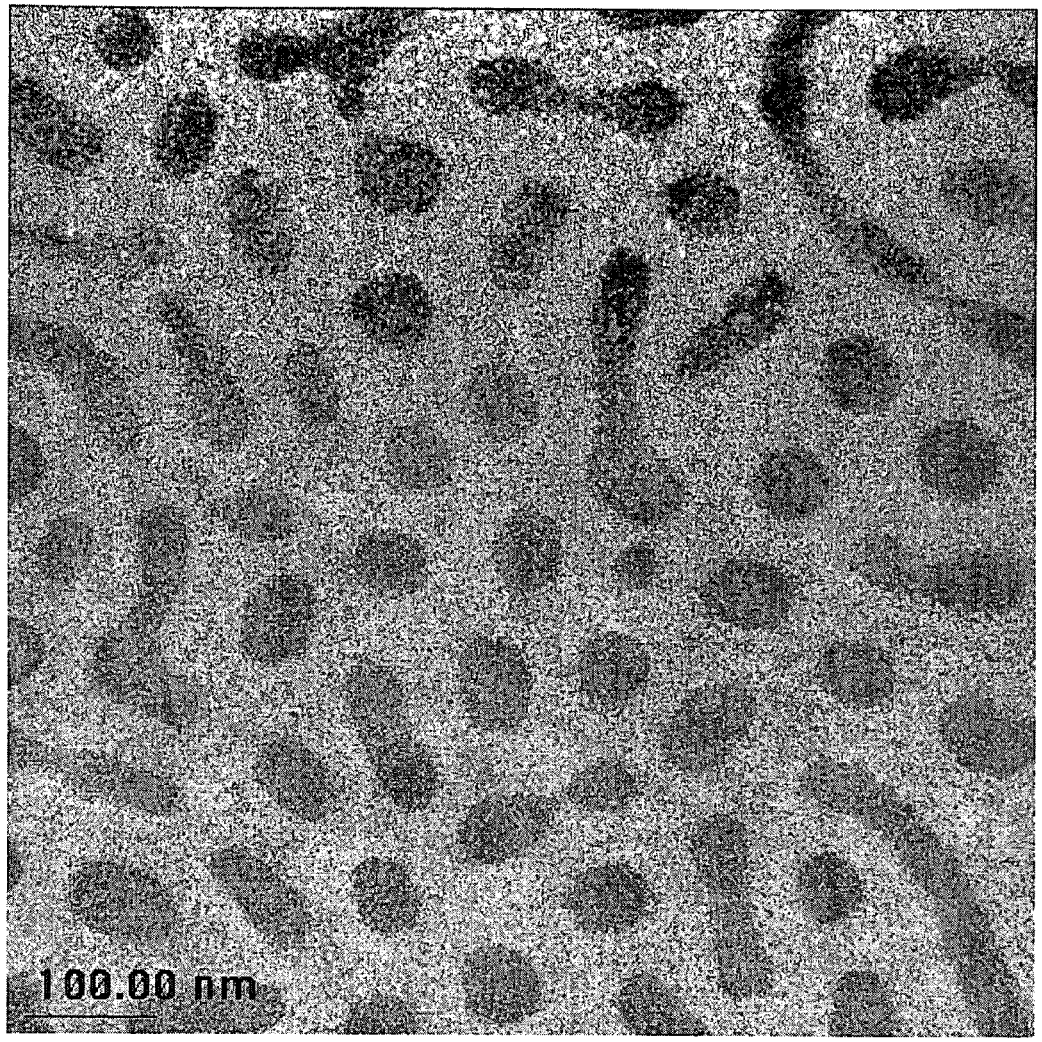
FIG. 13 is a TEM photograph of a collection of disk-like nanoparticles.

A TEM analysis was done on a hexane solution of the final product at $10^{-5}$ wt % concentration. A drop of the diluted solution was coated on a carbon coated copper micro-grid. After the solvent was vaporized, the grid was stained with $OsO_4$ and was then examined by TEM. The result is shown in FIG. 13.

Figure 14:
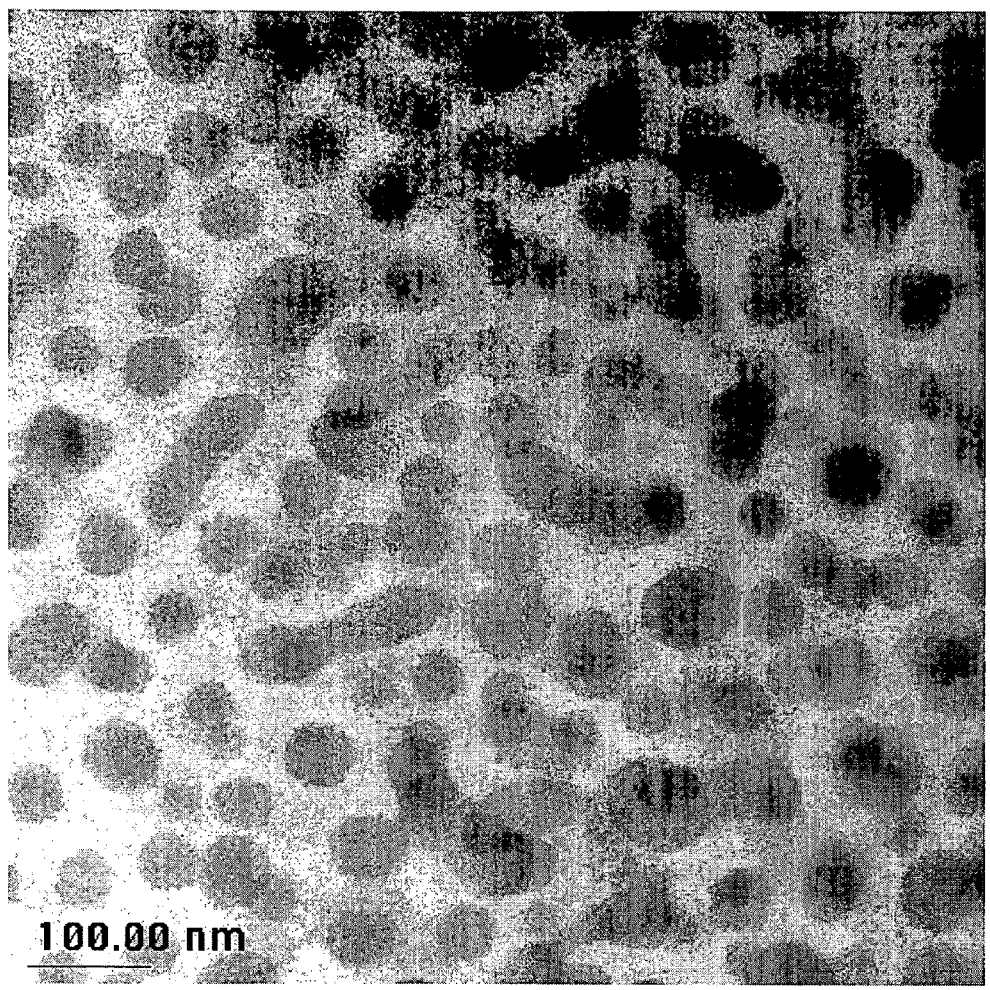
FIG. 14 is a second TEM photograph of the collection of disk-like nanoparticles.

The same TEM analysis was also done on a toluene solution of the final product at $10^{-5}$ wt % concentration. The result is shown in FIG. 14.

Figure 18:
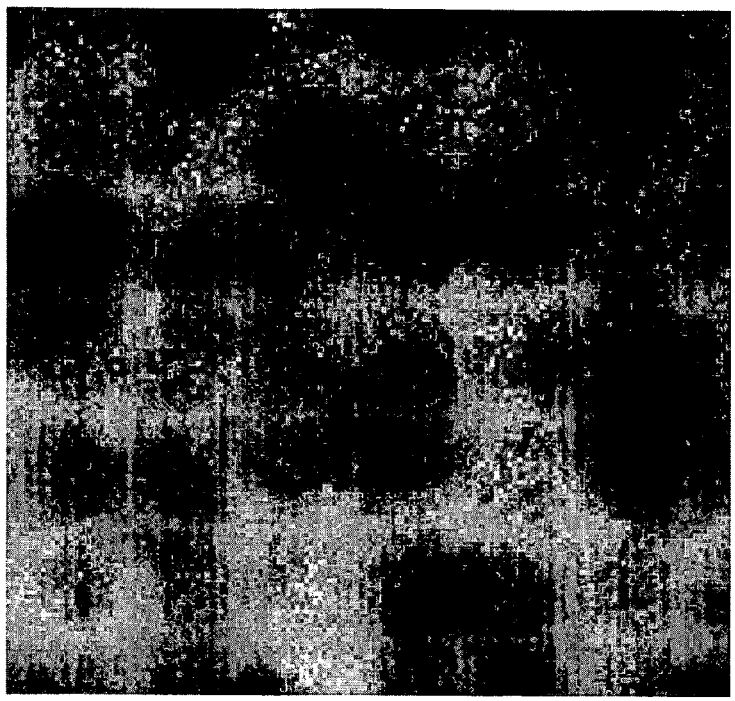
FIG. 18 is a TEM photograph of a fourth collection of disk-like nanoparticles with an illustration showing how the disk-like particles are overlapped.
Figure 18:
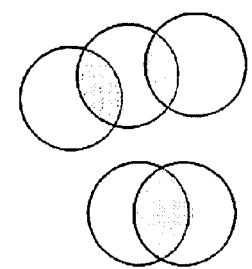

Both TEM results showed that the synthesized product contains disk-like nanoparticles. The disks display uniform gray color, which indicates that within the disk the thickness is mostly constant. Overlapping between two disks is shown as an oval-shaped dark color. This is illustrated in FIG. 18 showing a collection of nanoparticles and an illustration how they are overlapping. The thickness of the disk can also be measured in the TEM using shadow-casting technique. The disks have a thickness around 5 to 10 nm.

Example 12

The same procedure as that shown in Example 11 was used, except for the amounts of materials used. In this example, the reactor was first charged with 5.15 lb of hexane, and 0.46 lb of butadiene/hexane blend (containing 21.7 wt % of butadiene). The reactor was then set to 135° F. After the temperature was stabilized, 4 ml (1 M) of 4,4'-trimethylenedipiperidine in toluene and 5.4 ml (1.6 M) of butyllithium in hexane were charged to the reactor. After three hours, 2.7 ml of OOPs (1.6M) in hexane was charged to the reactor. Then, the reactor was charged with 2.73 lb of styrene/hexane blend (containing 33 wt % styrene). The reaction continued for another 3 hrs. Subsequently, the reactor was charged with 50 ml of divinyl benzene. After 2.5 more hours, the reaction was stopped by dropping the product into isopropenol and then treated with AO (~1% Irganox-1520L). The product was 10 wt % butadiene and 90 wt % styrene.

Figure 15:
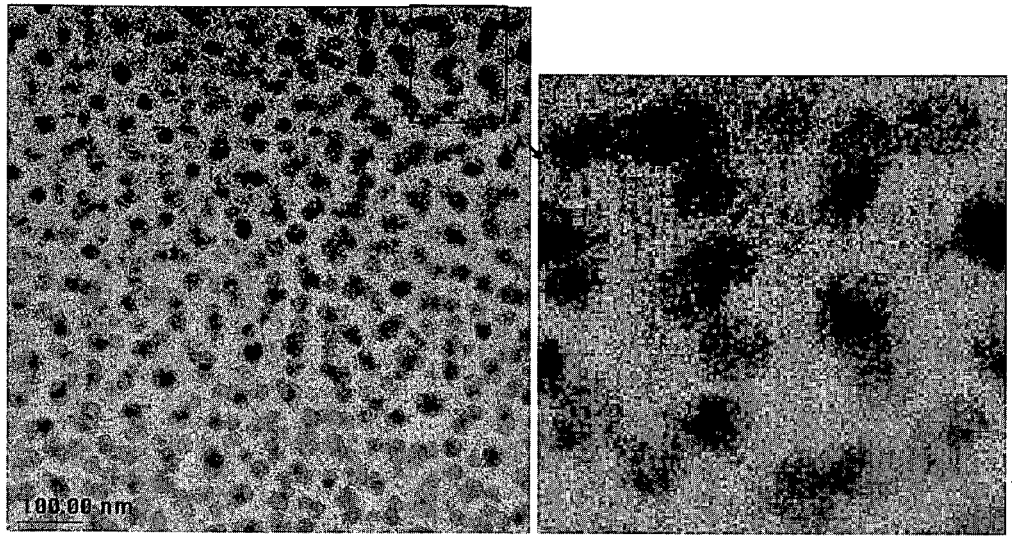
FIG. 15 is a TEM photograph of a second collection of disk-like nanoparticles.
Figure 16:
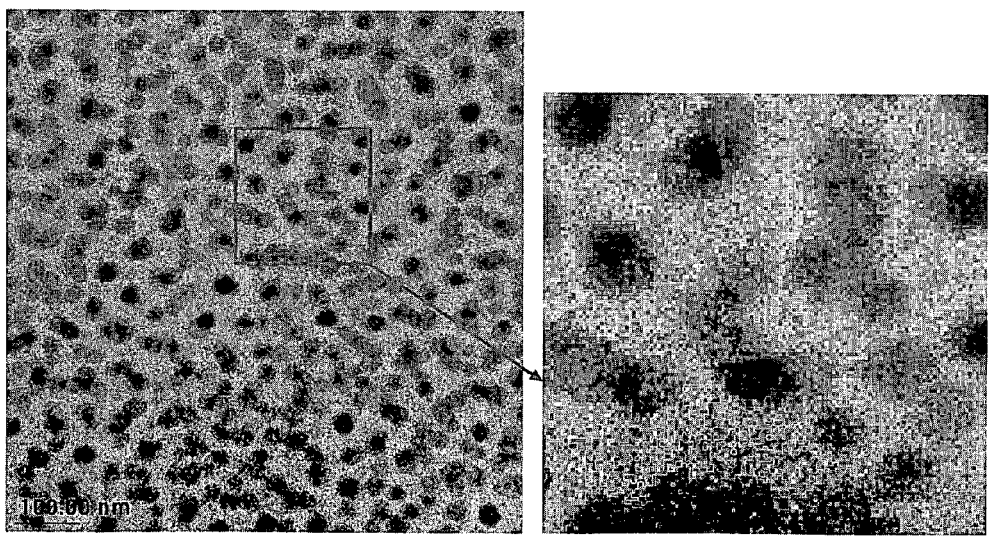
FIG. 16 is a second TEM photograph of the second collection of disk-like nanoparticles.

A drop of the diluted hexane solution, ~1×10$^{-5}$ wt %, was coated on a carbon coated copper microgrid. After the solvent was vaporized, the grid was stained with Os0$_4$ and was then examined by TEM. The result is shown in FIG. 15 and FIG. 16.

Example 13

Once again, the same procedure as that shown in Example 11 was used, except for the amounts of materials used. In this example, the reactor was first charged with 4.83 lb of hexane, and 1.38 lb of butadiene/Hexane blend (containing 21.7 wt % of butadiene). The reactor was then set to 135° F. After the temperature was stabilized, 4 ml (1 M) of 4,4'-trimethylenedipiperidine in toluene and 5.4 ml (1.6 M) of butyllithium in hexane were charged to the reactor. After three hours, 2.7 ml of OOPs (1.6 M) in hexane was charged to the reactor. Then, the reactor was charged with 2.12 lb styrene/hexane blend (containing 33 wt % styrene). The reaction was continued for another 3 hrs. Then the reactor was charged with 50 ml of divinyl benzene. After 2.5 more hours, the reaction was stopped by dropping the product into isopropenol and then treated with AO (~1% Irganox-1520L). The product was 30 wt % butadiene and 70 wt % styrene.

Figure 17:
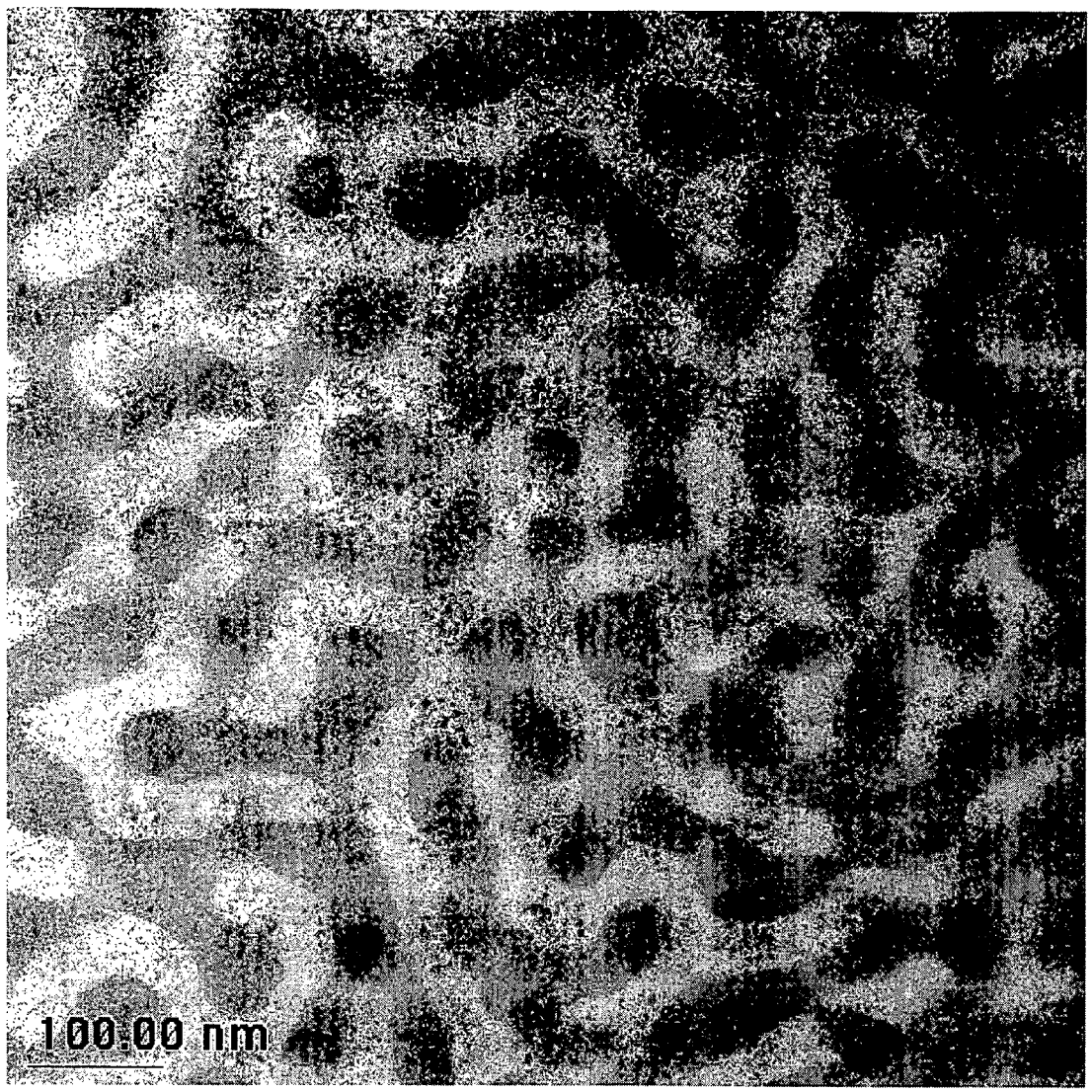
FIG. 17 is a TEM photograph of a third collection of disk-like nanoparticles.

A drop of the diluted hexane solution, ~1×10$^{-5}$ wt %, was coated on a carbon coated copper microgrid. After the solvent was vaporized, the grid was stained with OsO$_4$ and was then examined by TEM. The result is shown in FIG. 17. The particles were not well-organized in term of shapes.

This written description sets forth the best mode of the invention, and describes the invention so as to enable a person skilled in the art to make and use the invention, by presenting examples. The patentable scope of the invention is defined by the claims, and may include other examples that occur to those skilled in the art.

It is claimed:

1. A method for making disk-like nanoparticles in a liquid hydrocarbon medium, the nanoparticles having a core layer and a shell layer, the shell layer comprising tri-block copolymer chains having a first block, a second block, and a third block, the method comprising the steps of:
   polymerizing a conjugated diene monomer with a multifunctional initiator;
   copolymerizing a vinyl aromatic monomer to form the first and third blocks, thereby producing the tri-block copolymer chains;
   assembling the tri-block copolymer chains in the liquid hydrocarbon medium to form micelle structures; and
   crosslinking a multiple-vinyl-substituted aromatic hydrocarbon with the tri-block copolymer chains in the micelle structures to form a cross-linked core and to form polymer nanoparticles.

2. The method of claim 1, wherein the initiator is a hydrocarbon solvent soluble, anionic polymerization multi-lithio amine initiator that comprises at least two or more lithio amines in one molecule and has the general formula:

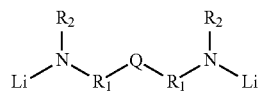

wherein Q is (a) an element selected from the group consisting of O, S, N, P and Si or (b) an alkylene group having from 1 to 20 methylene groups, and R$_1$ and R$_2$ are selected from the group consisting of alkyls, cycloalkyls and aralkyls containing from 1 to 20 carbon atoms.

3. The method of claim 1, wherein the initiator is dilithio N,N'-diethyl-1,3-propanediamine (Li-DEPDA-Li), dilithio N,N'-diisopropyl-1,3-propanediamine (Li-DPPDA-Li), dilithio N,N'-diethyl-2-butene-1,4-diamine (Li-DEBDA-Li), trilithio tris[2-(methylamino)ethyl]amine (Tri-Li-TMAEA), trilithio tris[2-(isopropylamino)ethyl]amine (Tri-Li-TP AEA), or trilithio-1,5,9-triazacyclododecane (Tri-Li-T ACD).

4. The method of claim 1, wherein the weight ratio of the monomer units comprising the first block and third block to the monomer units comprising the second block is 50:1 to 1:1.

5. The method of claim 1, further comprising the step of adding a monoblock polymer and/or copolymerizing a diblock copolymer, and cross-linking the mono block polymer and/or diblock copolymer with the core.

6. The method of claim 1, wherein the tri-block copolymer chains are A-B-A copolymer chains.

7. The method of claim 1 further comprising the step of adding a monoblock polymer and/or adding or synthesizing a diblock copolymer prior to the crosslinking step.

8. A method for making a composition comprising:
   mixing disk-like nanoparticles with a rubber matrix;
   the disk-like nanoparticles having a core layer comprising a cross-linked multi-vinyl substituted aromatic hydrocarbon;
   a shell layer comprising tri-block copolymer chains, each having a first, a second, and a third block;
   the first and third blocks comprising a vinyl aromatic monomer and being crosslinked with the core;
   the second block comprising a conjugated diene monomer and comprising top and bottom surfaces of the disk-like nanoparticles;
   the weight ratio of the monomers comprising the first block and third block to the monomers comprising the second block is 100:1 to 1:1.

9. The method of claim 8, wherein the weight ratio of the monomer units comprising the first block and third block to the monomer units comprising the second block is 50:1 to 1:1.

10. The method of claim 8, wherein the disk-like nanoparticles are initiated with dilithio N,N'-diethyl-1,3-propanediamine (Li-DEPDA-Li), dilithio N,N'-diisopropyl-1,3-propanediamine (Li-DPPDA-Li), dilithio N,N'-diethyl-2-butene-1,4-diamine (Li-DEBDA-Li), trilithio tris[2-(methylamino)ethyl]amine (Tri-Li-TMAEA), trilithio tris[2-(isopropylamino)ethyl]amine (Tri-Li-TP AEA), or trilithio-1,5,9-triazacyclododecane (Tri-Li-T ACD).

11. The method of claim 8, wherein the disk-like nanoparticles are initiated with Li-4,4'trimethylenedipiperidine-Li.

12. The method of claim 8, wherein the tri-block copolymer chains are A-B-A copolymer chains.

13. The method of claim 8, further comprising vulcanizing the composition.

14. The method of claim 8, further comprising mixing a reinforcing filler selected from carbon black, silica, or both.

15. The method of claim 8, further comprising mixing a filler selected from the group consisting of: aluminum silicate, calcium silicate, magnesium silicate, clay (hydrous aluminum silicate), talc (hydrous magnesium silicate), and mica, urea, sodium sulfate, and mixtures thereof.

16. The method of claim 8, wherein the rubber of the rubber matrix is natural rubber, synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber, or mixtures thereof.

17. The method of claim 8, wherein the rubber of the rubber matrix is a diene homopolymer, or copolymers and terpolymers of conjugated diene monomers with vinyl aromatic monomers and trienes, or mixtures thereof.

18. A method for making a tire component comprising:
mixing disk-like nanoparticles with a rubber matrix;
vulcanizing the mixture; and
forming a tire component from the mixture;
the disk-like nanoparticles having a core layer comprising a cross-linked multi-vinyl substituted aromatic hydrocarbon;
a shell layer comprising tri-block copolymer chains, each having a first, a second, and a third block;
the first and third blocks comprising a vinyl aromatic monomer and being crosslinked with the core;
the second block comprising a conjugated diene monomer and comprising top and bottom surfaces of the disk-like nanoparticles;
the weight ratio of the monomers comprising the first block and third block to the monomers comprising the second block is 100:1 to 1:1.

19. The method of claim 18, further comprising mixing, prior to the vulcanizing step, a reinforcing filler selected from carbon black, silica, or both.

20. The method of claim 18, wherein the rubber of the rubber matrix is a diene homopolymer, or copolymers and terpolymers of conjugated diene monomers with vinyl aromatic monomers and trienes, or mixtures thereof.

* * * * *